(12) United States Patent
Arita et al.

(10) Patent No.: US 8,648,514 B2
(45) Date of Patent: Feb. 11, 2014

(54) ROTARY ELECTRIC MOTOR AND BLOWER THAT USES THE SAME

(75) Inventors: Hideaki Arita, Tokyo (JP); Masaya Inoue, Tokyo (JP); Masahiro Iezawa, Tokyo (JP); Hayato Yoshino, Tokyo (JP); Kazuhiko Baba, Tokyo (JP); Hitoshi Kawaguchi, Tokyo (JP); Toshihiko Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 538 days.

(21) Appl. No.: 12/991,261

(22) PCT Filed: Apr. 28, 2009

(86) PCT No.: PCT/JP2009/058376
§ 371 (c)(1),
(2), (4) Date: Nov. 5, 2010

(87) PCT Pub. No.: WO2009/136574
PCT Pub. Date: Nov. 12, 2009

(65) Prior Publication Data
US 2011/0070108 A1    Mar. 24, 2011

(30) Foreign Application Priority Data

May 8, 2008  (JP) ................................ 2008-122082
May 8, 2008  (JP) ................................ 2008-122085
May 8, 2008  (JP) ................................ 2008-122087

(51) Int. Cl.
*H02K 21/28* (2006.01)
*H02K 21/38* (2006.01)
*H02K 37/10* (2006.01)
*H02K 1/17* (2006.01)

(52) U.S. Cl.
USPC ...... 310/181; 310/165; 310/269; 310/154.01; 310/112

(58) Field of Classification Search
USPC .............. 310/49.01, 49.43, 49.46, 155, 181, 310/152.01, 162, 165, 269, 112, 114
See application file for complete search history.

(56) References Cited

U.S. PATENT DOCUMENTS 3,293,459 A * 12/1966 Kreuter et al. ............. 310/49.46
4,385,251 A *  5/1983 Mallick et al. ................ 310/178

(Continued)

FOREIGN PATENT DOCUMENTS

DE      28 23 313 A1   12/1979
JP      48-43111       *  6/1973

(Continued)

OTHER PUBLICATIONS

U.S. Appl. No. 12/990,952, filed Nov. 4, 2010, Arita, et al.

(Continued)

*Primary Examiner* — Burton Mullins
(74) *Attorney, Agent, or Firm* — Oblon, Spivak, McClelland, Maier & Neustadt, L.L.P.

(57) ABSTRACT

In a rotary electric motor a first stator core and a second stator core are disposed coaxially so as to be separated by a predetermined distance axially and such that circumferential positions of teeth are aligned, and a first rotor core and a second rotor core on which salient poles are disposed at a uniform angular pitch circumferentially are fixed coaxially to a rotating shaft so as to be positioned on inner peripheral sides of the first stator core and the second stator core, respectively, and so as to be offset circumferentially by a pitch of half a salient pole from each other. A first permanent magnet that is magnetically oriented such that a direction of magnetization is radially inward is disposed on an outer peripheral surface of a core back of the first stator core, and an outer peripheral surface of the first permanent magnet and the outer peripheral surface of the core back of the second stator core are linked by a frame that is made of a magnetic material.

16 Claims, 17 Drawing Sheets

(56) References Cited

U.S. PATENT DOCUMENTS

| | | | | |
|---|---|---|---|---|
| 4,496,868 A | * | 1/1985 | Advolotkin et al. | 310/112 |
| 4,899,072 A | * | 2/1990 | Ohta | 310/49.46 |
| 4,970,423 A | * | 11/1990 | Tamae et al. | 310/162 |
| 5,304,882 A | * | 4/1994 | Lipo et al. | 310/156.53 |
| 5,682,073 A | * | 10/1997 | Mizuno | 310/165 |
| 5,942,829 A | * | 8/1999 | Huynh | 310/178 |
| 7,969,056 B2 | * | 6/2011 | Mizutani et al. | 310/156.07 |
| 2007/0138896 A1 | * | 6/2007 | Zhu | 310/181 |
| 2008/0224574 A1 | * | 9/2008 | Enomoto et al. | 310/49 R |

FOREIGN PATENT DOCUMENTS

| | | | | | |
|---|---|---|---|---|---|
| JP | 53-67819 | * | 6/1978 | | H02K 21/38 |
| JP | 53 67819 | | 6/1978 | | |
| JP | 60 9353 | | 1/1985 | | |
| JP | 61 176977 | | 11/1986 | | |
| JP | 61-176977 | * | 11/1986 | | H02K 21/44 |
| JP | 63-95844 | * | 4/1988 | | H02K 37/10 |
| JP | 8 214519 | | 8/1996 | | |
| JP | 09-168265 | * | 6/1997 | | H02K 17/26 |
| JP | 2004 88880 | | 3/2004 | | |
| JP | 2007 104830 | | 4/2007 | | |
| WO | 2008 059681 | | 5/2008 | | |

OTHER PUBLICATIONS

International Search Report issued Jun. 2, 2009 in PCT/JP09/58376 filed Apr. 28, 2009.

German Office Action issued Jul. 4, 2012 in patent application No. 11 2009 001 148.9 with English translation.

* cited by examiner

ROTARY ELECTRIC MOTOR AND BLOWER
THAT USES THE SAME

TECHNICAL FIELD

The present invention relates to a rotary electric motor that is operated at high speed and a blower that uses the same, and particularly relates to a rotary electric motor that uses a permanent magnet that is disposed in a stator as a field magnetomotive force generating means.

BACKGROUND ART

Conventional electric motors that have a permanent magnet that is disposed on a stator include a stator core that is configured by laminating thin stator plates at two axial ends of a ring-shaped permanent magnet that has been magnetized axially; and a rotor that is configured by laminating salient pole-shaped thin laminating plates such that salient poles are offset by half a pitch at a North-seeking (N) pole end and a South-seeking (S) pole end of a magnetic pole that is produced by a permanent magnet (see Patent Literature 1, for example).

CITATION LIST

Patent Literature

Patent Literature 1; Japanese Patent Laid-Open No. HEI 08-214519 (Gazette)

DISCLOSURE OF THE INVENTION

Problem to be Solved by the Invention

In conventional electric motors, because a permanent magnet is held between a stator core that is divided into two sections, and is magnetized axially, the magnetic flux from the permanent magnet flows so as to enter the N pole stator core from the N pole of the permanent magnet, enter the salient poles at a first end of the rotor from tooth portions of the N pole stator core, flow through the rotor to a second end, enter the S pole stator core from to the salient poles at the second end of the rotor, and return to the S pole of the permanent magnet.

Now, because the thin stator plates that constitute the stator core are coated with an insulating coating, the insulating coatings that are present between the laminated thin stator plates form magnetic gaps, which constitute a factor that increases magnetic resistance. Consequently, magnetic resistance in the direction of lamination of the thin stator plates in the N pole and S pole stator cores increases as the number of stacked plates increases. Thus, as the magnetic flux flows axially from the permanent magnets and flows through the N pole stator core in the direction of lamination of the thin stator plates, the magnetic flux cannot enter deeply into the N pole stator core, and flows radially inward through the thin stator plates near the permanent magnet of the N pole stator core. In other words, in conventional electric motors, one problem has been that the magnetic flux from the permanent magnet is biased toward flowing near the permanent magnet in the two stator cores, reducing effective magnetic flux and lowering efficiency.

The amount of effective magnetic flux is proportional to the magnet cross-sectional area that is perpendicular to the direction of magnetization of the permanent magnet. In conventional electric motors, because the permanent magnet is magnetized axially, the cross section that is perpendicular to the direction of magnetization of the permanent magnet is constituted by a ring-shaped surface that has a predetermined radial width that is centered around a central axis of a rotating shaft. Thus, to increase the amount of effective magnetic flux in conventional electric motors, that is, to increase the magnet cross-sectional area that is perpendicular to the direction of magnetization of the permanent magnet, it is necessary to increase the radial width of the permanent magnet, that is, a difference between an inside diameter and an outside diameter. If the inside diameter is restricted to a certain magnitude for reasons of rotor torque, it is necessary to increase the outside diameter of the permanent magnet, and as a result, the outside diameter of the rotary electric motor itself will be increased.

When a high-speed motor that achieves 70,000 to 100,000 revolutions per minute is combined with a fan, in particular, it is necessary to reduce fan diameter due to strength constraints that result from centrifugal forces, and as a result, there is a tendency for the expulsion air channel of the fan also to be reduced in diameter. In contrast, if the diameter of the motor is large, the expulsion air channel of the fan will be obstructed, and it becomes necessary to adapt the layout such that the positions of the expulsion air channel and the motor do not interfere with each other.

When considering integrating a small-diameter axial flow fan and a motor, and housing the motor internally on an inner peripheral side of the air channel of the fan, for example, it is also desirable to reduce the motor outside diameter together with the fan diameter of the axial flow fan, but one problem has been that conventional electric motors cannot sufficiently accommodate reductions in outside diameter, and are difficult to apply to high-speed fan motor applications in particular.

The present invention aims to solve the above problems and an object of the present invention is to provide a rotary motor that achieves increased efficiency, reduced size, and increased speed by making a direction of magnetization of a permanent magnet a radial direction to increase magnet cross-sectional area without increasing radial dimensions, and eliminating uneven distribution of magnetic flux that flows through a stator core to ensure an amount of effective magnetic flux, and a blower that uses the same.

Means for Solving the Problem

In order to achieve the above object, according to one aspect of the present invention, there is provided a rotary electric motor characterized in including: a stator including: a stator core that includes a first core pair that is configured such that a first stator core and a second stator core in which teeth that partition off slots that have openings on an inner peripheral side are disposed at a uniform angular pitch circumferentially so as to project radially inward from an inner peripheral surface of a cylindrical core back are disposed coaxially so as to be separated by a predetermined distance axially and such that circumferential positions of the teeth are aligned; and a stator coil that is mounted to the stator core; a first permanent magnet that is disposed on an outer peripheral surface of the core back of the first stator core, and that is magnetically oriented such that a direction of magnetization is in a first radial direction; an axial magnetic path forming member that is disposed so as to extend axially so as to link an outer peripheral surface of the first permanent magnet and the outer peripheral surface of the core back of the second stator core; and a rotor that is configured such that a first rotor core and a second rotor core on which salient poles are disposed at a uniform angular pitch circumferentially are fixed coaxially to a rotating shaft so as to be positioned on inner peripheral sides of the first stator core and the second stator core, respectively, and so as to be offset circumferentially by a pitch of half a salient pole from each other.

Effects of the Invention

According to the present invention, a first stator core and a second stator core are disposed so as to be separated by a predetermined distance axially, and a first permanent magnet that is magnetically oriented such that a direction of magnetization is in a first radial direction is disposed on an outer peripheral surface of a core back of a first stator core. Thus, magnet cross-sectional area that is perpendicular to the direction of magnetization of the first permanent magnet can be increased by increasing axial dimensions without changing the radial dimensions of the first permanent magnet. Because the amount of effective magnetic flux can thereby be ensured without increasing radial dimensions, a rotary electric motor can be achieved simply that can be used in compact, high-speed motor applications.

In addition, an axial magnetic path forming member is disposed so as to extend axially so as to link the outer peripheral surface of the first permanent magnet and the outer peripheral surface of the core back of the second stator core. Thus, if the direction of magnetization of the first permanent magnet is radially outward, magnetic flux from the first permanent magnet flows axially through the axial magnetic path forming member toward the second stator core, and flows uniformly into the second stator core. If the direction of magnetization of the first permanent magnet is radially inward, magnetic flux from the first permanent magnet flows uniformly through the first stator core, flows radially inward through the first rotor core of the rotor, enters the rotating shaft, flows axially through the rotating shaft toward the second rotor core, and flows radially outward uniformly through the second rotor core and the second stator core. Consequently, because reductions in the amount of effective magnetic flux that result from the magnetic flux flowing biasedly toward facing end portions of the first and second stator cores, i.e., toward a center of the first core pair, are suppressed, a high-efficiency rotary electric motor can be achieved.

BEST MODE FOR CARRYING OUT THE INVENTION

Preferred embodiments of the rotary electric motor according to the present invention will now be explained using the drawings.

Embodiment 1

Figure 1:
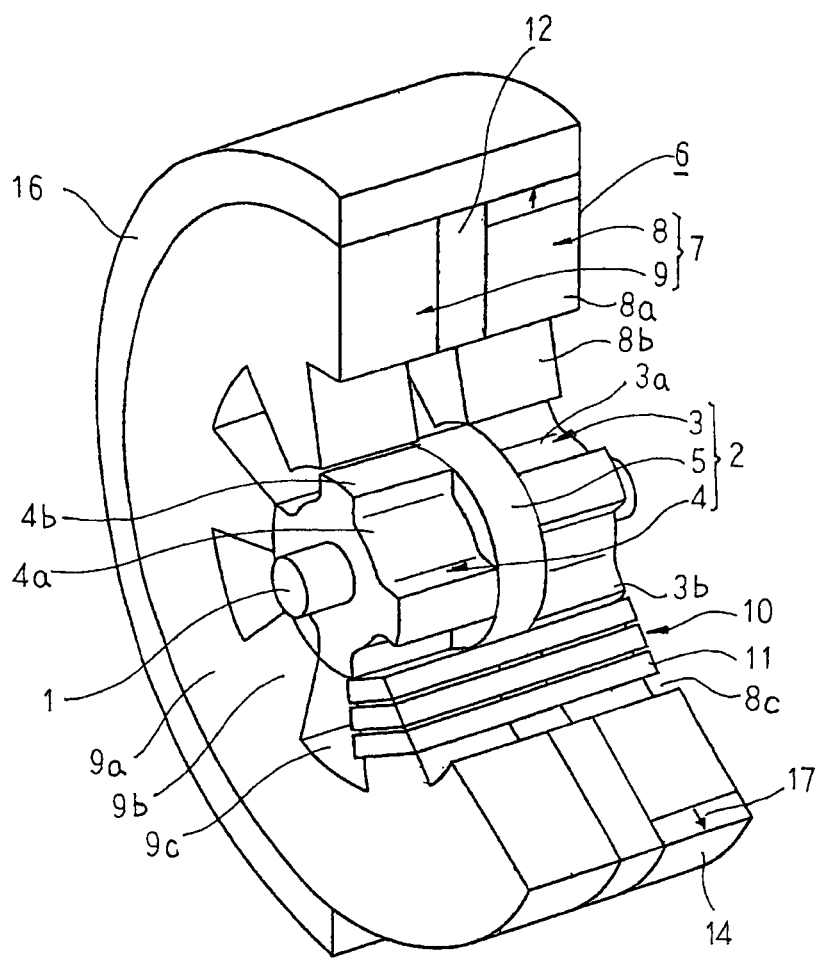
FIG. 1 is a partially cut away perspective that shows a rotary electric motor according to Embodiment 1 of the present invention.
Figure 2:
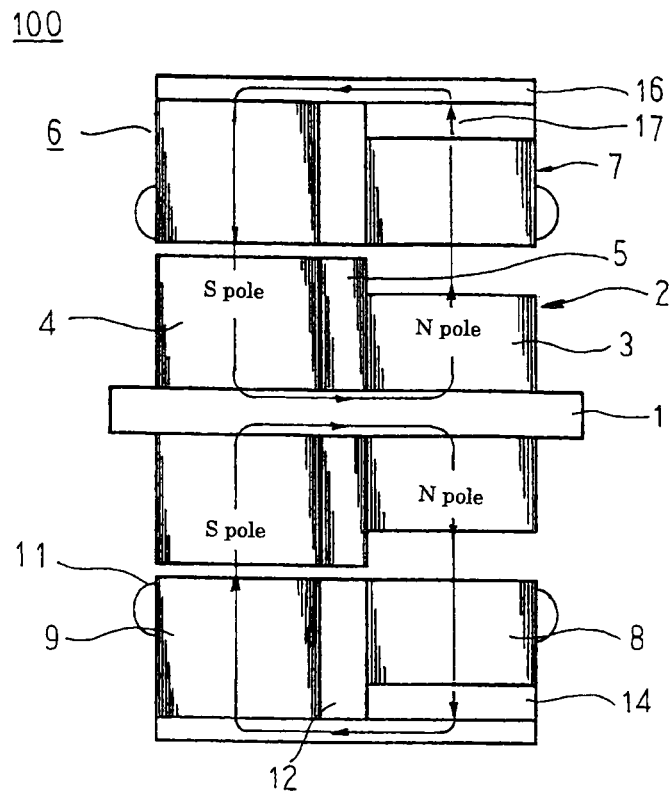
FIG. 2 is a longitudinal cross section that explains flow of magnetic flux in the rotary electric motor according to Embodiment 1 of the present invention.

FIG. 1 is a partially cut away perspective that shows a rotary electric motor according to Embodiment 1 of the present invention, and FIG. 2 is a longitudinal cross section that explains flow of magnetic flux in the rotary electric motor according to Embodiment 1 of the present invention.

In FIGS. 1 and 2, a rotary electric motor 100 is a synchronous rotary machine that has permanent magnets, and includes: a rotor 2 that is fixed coaxially to a rotating shaft 1 that is prepared using a magnetic material; a stator 6 that is formed by mounting a stator coil 10 that functions as a torque generating driving coil to a stator core 7 that is disposed coaxially so as to surround the rotor 2; a first permanent magnet 14 that functions as a field magnetomotive force generating means that generates a field magnetomotive force; and a frame 16 that houses and holds the rotor 2, the stator 6, and the first permanent magnet 14 internally. Here, the frame 16 is prepared into a cylindrical shape, for example, using a magnetic material such as iron, etc., and also functions as an axial magnetic path forming member.

The rotor 2 includes: first and second rotor cores 3 and 4 that are prepared, for example, by laminating and integrating a large number of magnetic steel plates that are formed into a predetermined shape; and a disk-shaped partitioning wall 5 that is prepared by laminating and integrating a predetermined number of magnetic steel plates, and through a central axial position of which a rotating shaft insertion aperture is disposed. The first and second rotor cores 3 and 4 are prepared into identical shapes, and are constituted by: cylindrical base portions 3a and 4a through a central axial position of which a rotating shaft insertion aperture is disposed; and four, for example, salient poles 3b and 4b that are disposed so as to project radially outward from outer circumferential surfaces of the base portions 3a and 4a are disposed so as to extend axially, and are disposed at a uniform angular pitch circumferentially. The first and second rotor cores 3 and 4 are offset circumferentially by a pitch of half a salient pole, are disposed in close proximity facing each other so as to have the partitioning wall 5 interposed, and are fixed to the rotating shaft 1 that is inserted into their rotating shaft insertion apertures to configure the rotor 2.

The stator core 7 includes first and second stator cores 8 and 9 that are prepared so as to have axial thicknesses equal to those of the first and second rotor cores 3 and 4 by laminating and integrating a large number of magnetic steel plates that are formed so as to have a predetermined shape. The first stator core 8 includes: a cylindrical core back 8a; and six, for example, teeth 8b that are disposed so as to project radially inward from an inner peripheral surface of the core back 8a at a uniform angular pitch circumferentially. Slots 8c that have openings on an inner peripheral side are partitioned off between circumferentially adjacent teeth 8b. The second stator core 9 includes: a cylindrical core back 9a; and six, for example, teeth 9b that are disposed so as to project radially inward from an inner peripheral surface of the core back 9a at a uniform angular pitch circumferentially. Slots 9c that have openings on an inner peripheral side are partitioned off between circumferentially adjacent teeth 9b. Here, the second stator core 9 is prepared so as to have a similar shape to that of the first stator core 8 except that its outside diameter is increased by an amount equivalent to a thickness of the first permanent magnet 14.

A spacer 12 is prepared into a cylindrical body that has an axial thickness equal to that of the partitioning wall 5 and a radial dimension equal to that of the core back 9a using a metal material such as a stainless alloy or aluminum, etc., and a nonmagnetic material such as a synthetic resin, etc., such as a polyphenylene sulfide resin, etc. The first permanent magnet 14 is prepared into a cylindrical body that has an axial thickness equal to that of the first stator core 8 and an inside diameter that is equal to the outside diameter of the first stator core 8, and is magnetically oriented such that a direction of magnetization 17 thereof is radially outward.

First and second stator cores 8 and 9 that have been configured in this manner are disposed coaxially on opposite sides of the spacer 12 such that the circumferential positions of the teeth 8b and 9b are aligned, and constitute a first core pair. The first and second rotor cores 3 and 4 are disposed so as to be positioned on an inner peripheral side of the first and second stator cores 8 and 9, respectively. In addition, the first permanent magnet 14 is fitted so as to surround the first stator core 8.

The stator coil 10 has six phase coils 11 that are mounted by winding conducting wires onto teeth 8b and 9b that form pairs that face each other axially without spanning the slots 8c and 9c in a "concentrated winding method". In FIG. 1, only a single phase coil 11 that is wound in a concentrated winding on a single pair of teeth 8b and 9b is shown, but the stator coil 10 is actually configured by winding three phases (U, V, and W) sequentially in concentrated windings and then repeating for a second time, on six pairs of teeth 8b and 9b.

The rotary electric motor 100 is configured such the stator 6 is press-fitted and held inside the frame 16 with the first permanent magnet 14 mounted, and the rotor 2 is rotatably housed inside the stator 6 such that the rotating shaft 1 is rotatably supported by a pair of end plates (not shown). Here, an outer peripheral surface of the first permanent magnet 14 and an outer peripheral surface of the core back 9a of the second stator core 9 are linked by the frame 16.

In this rotary electric motor 100, as indicated by arrows in FIG. 2, a magnetic path is formed in which magnetic flux from the first permanent magnet 14 flows from the first permanent magnet 14 through the frame 16 toward the second stator core 9, then flows from the frame 16 through the second stator core 9, the second rotor core 4, the partitioning wall 5, and the rotating shaft 1 to the first rotor core 3, and then from the first rotor core 3 through the first stator core 8 and returns to the first permanent magnet 14. Thus, North-seeking (N) poles arise in the salient poles 3b of the first rotor core 3, and South-seeking (S) poles arise in the salient poles 4b of the second rotor core 4. Here, because the salient poles 3b and 4b of the first and second rotor cores 3 and 4 are offset by a pitch of half a salient pole circumferentially, the N poles and the S poles are disposed alternately in a circumferential direction when viewed from an axial direction. The magnetic flux from the first permanent magnet 14 and the magnetic flux from the stator coil 10 interact to generate torque. The rotary electric motor 100 operates as a noncommutator motor, and operates magnetically in a similar manner to that of a concentrated winding permanent-magnet dynamoelectric machine that has eight poles and six slots.

In Embodiment 1, because the first permanent magnet 14 is prepared into a cylindrical body that surrounds the first stator core 8, and is magnetically oriented in a radial direction, a magnetic path cross section that is perpendicular to the direction of magnetization 17 of the first permanent magnet 14 is a cylindrical surface that is centered around the central axis of the rotating shaft 1. Thus, magnet cross-sectional area perpendicular to the direction of magnetization 17 of the first permanent magnet 14 can be increased by increasing axial dimensions without increasing radial dimensions. Consequently, because the amount of effective magnetic flux can be ensured by increasing magnet cross-sectional area without increasing radial dimensions, a rotary electric motor 100 that can be used in compact, high-speed motor applications can be achieved simply.

In Embodiment 1, because the first permanent magnet 14 is prepared into a cylindrical body that surrounds the first stator core 8, and is magnetically oriented in a radial direction, and the frame 16, which is made of a magnetic material, is disposed so as to link the outer peripheral surface of the first permanent magnet 14 and the outer peripheral surface of the core back 9a of the second stator core 9, the first permanent magnet 14 and the second stator core 9 are magnetically connected through the frame 16. Thus, magnetic flux from the first permanent magnet 14 enters the frame 16, flows axially through the frame 16 and reaches a second stator core 9 end, and enters the second stator core 9 from a region of the frame 16 extending over an entire axial length of the second stator core 9. The magnetic flux thereby flows approximately uniformly through each of the magnetic steel plates of the second stator core 9. Consequently, because reductions in the amount of effective magnetic flux that result from the magnetic flux flowing biasedly toward facing end portions of the first and second stator cores 8 and 9, i.e., toward a center of the first core pair, are suppressed, a high-efficiency rotary electric motor 100 can be achieved.

In Embodiment 1, because the first permanent magnet 14 is prepared into a cylindrical body, mounting of the first permanent magnet 14 onto the first stator core 8 is simplified, and the amount of magnetic flux can also be increased.

Because the frame 16 that is prepared using a magnetic material is used as an axial magnetic path forming member, it is not necessary to prepare an axial magnetic path forming member separately, enabling reductions in the number of parts.

Embodiment 2

Figure 3:
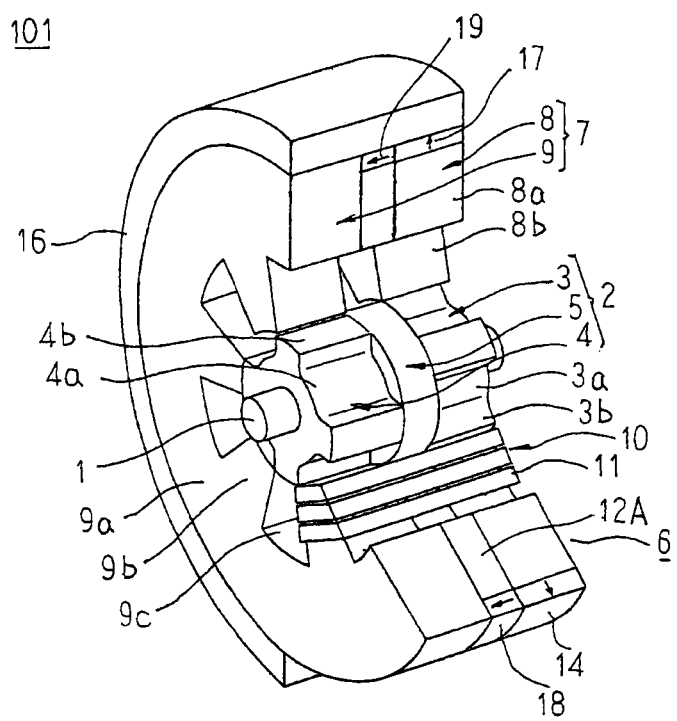
FIG. 3 is a partially cut away perspective that shows a rotary electric motor according to Embodiment 2 of the present invention.
Figure 4:
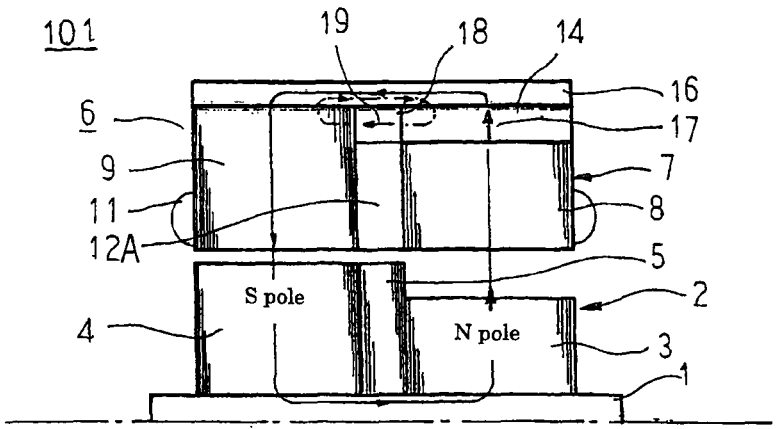
FIG. 4 is a longitudinal cross section that explains effects due to a third permanent magnet in the rotary electric motor according to Embodiment 2 of the present invention.

FIG. 3 is a partially cut away perspective that shows a rotary electric motor according to Embodiment 2 of the present invention, and FIG. 4 is a longitudinal cross section that explains effects due to a third permanent magnet in the rotary electric motor according to Embodiment 2 of the present invention.

In FIG. 3, a spacer 12A is prepared into a cylindrical body that has a radial dimension equal to that of a core back 8a, and a third permanent magnet 18 is prepared into a cylindrical body that has an axial length equal to that of the spacer 12A and a radial dimension that is equal to that of a first permanent magnet 14 is mounted so as to surround the spacer 12A, and is interposed between the first permanent magnet 14 and a core back 9a of a second stator core 9. The third permanent magnet 18 is magnetically oriented axially such that a direction of magnetization 19 thereof is directed from the first permanent magnet 14 toward the core back 9a of the second stator core 9.

Moreover, the rest of the configuration is configured in a similar manner to Embodiment 1 above.

In a rotary electric motor 101 that has been configured in this manner, a magnetic path is formed in which magnetic flux from the third permanent magnet 18 enters the frame 16 from the core back 9a of the second stator core 9, flows through the frame 16 toward the first permanent magnet 14, and returns to the third permanent magnet 18 through the first permanent magnet 14, as indicated by a dotted chain line in FIG. 4. Here, the magnetic flux from the third permanent magnet 18 flows through the frame 16 in a reverse direction to the magnetic flux from the first permanent magnet 14, alleviating magnetic saturation of the frame 16. In other words, the third permanent magnet 18 constitutes a magnetic saturation alleviating means for the axial magnetic path forming member.

Thus, according to Embodiment 2, because magnetic saturation of the frame 16 is alleviated, the amount of effective magnetic flux is increased, enabling output to be improved, and the frame 16 can also be made thinner, enabling reductions in size and weight of the rotary electric motor 101.

Embodiment 3

Embodiment 3 is configured in a similar manner to Embodiment 1 above except that a first permanent magnet is constituted by a plurality of magnet bodies that are each prepared into a strip shape that has a circular arc-shaped cross section that has a predetermined thickness.

Figure 5:
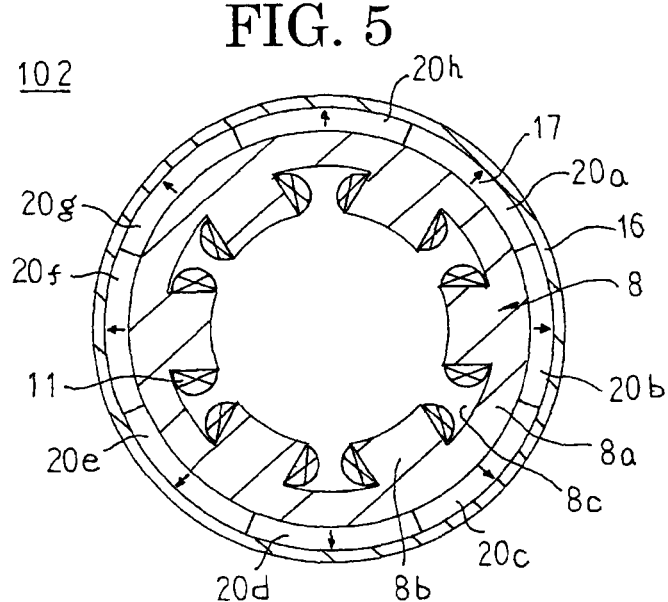
FIG. 5 is a lateral cross section that shows a rotary electric motor according to Embodiment 3 of the present invention.

FIG. 5 is a lateral cross section that shows a rotary electric motor according to Embodiment 3 of the present invention.

In FIG. 5, a first permanent magnet is constituted by strip-shaped magnet bodies 20a through 20h that have circular arc-shaped cross sections that have a shape in which a first permanent magnet 14 that has a cylindrical body described above has been divided into eight, for example, equal sections circumferentially. Each of the magnet bodies 20a through 20h is magnetically oriented such that directions of magnetization 17 thereof are oriented radially outward.

Now, if the permanent magnet is prepared into a single cylindrical body, magnetic flux components that interact with the permanent magnet during rotation of the rotor fluctuate somewhat, generating eddy current loss due to the fluctuating magnetic flux in the permanent magnet together therewith.

In a rotary electric motor 102 that has been configured in this manner, because the permanent magnet is divided into a plurality of magnet bodies 20a through 20h, the eddy current path is also simultaneously divided, and eddy currents are reduced as a result, enabling eddy current loss that arises in the permanent magnet also to be reduced.

Moreover, in Embodiment 3 above, the magnet bodies 20a through 20h are arranged on an outer peripheral surface of the first stator core 8 without leaving gaps circumferentially, but a plurality of magnet bodies may also be arranged on an outer peripheral surface of a first stator core so as to have predetermined gaps circumferentially, and only one magnet body may also be disposed. If a plurality of magnet bodies are arranged circumferentially on an outer peripheral surface of a stator core, the magnetic balance will improve if they are arranged at a uniform angular pitch.

Embodiment 4

Embodiment 4 is configured in a similar manner to Embodiment 1 above except that the first permanent magnet is constituted by a plurality of magnet bodies that are each prepared into a cylindrical body.

Figure 6:
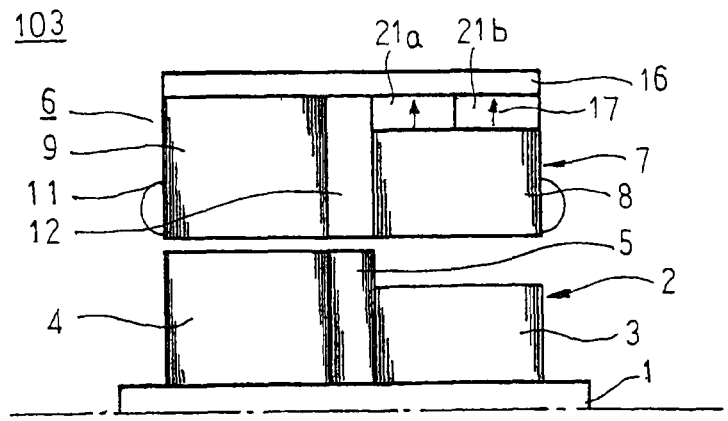
FIG. 6 is a longitudinal cross section that shows a rotary electric motor according to Embodiment 4 of the present invention.

FIG. 6 is a longitudinal cross section that shows a rotary electric motor according to Embodiment 4 of the present invention.

In FIG. 6, a first permanent magnet is constituted by magnet bodies 21a and 21b that have cylindrical bodies that have a shape in which a first permanent magnet 14 that has a cylindrical body described above has been divided into two equal sections axially. The magnet bodies 21a and 21b are each magnetically oriented such that directions of magnetization 17 thereof are oriented radially outward.

In a rotary electric motor 103 that has been configured in this manner, the magnet bodies 21a and 21b are fitted so as to surround the first stator core 8 such that directions of magnetization 17 are oriented radially outward and so as to be adjacent in an axial direction.

Consequently, in this rotary electric motor 103 eddy current paths are also divided by dividing the permanent magnet, enabling permanent magnet eddy current loss to be reduced.

Moreover, in Embodiment 4 above, a first permanent magnet is constituted by magnet bodies that have cylindrical bodies that have been divided into two sections axially, but the first permanent magnet may also be divided into three or more sections axially. Each of the magnet bodies may also be disposed so as to leave gaps axially.

Embodiment 5

Figure 7:
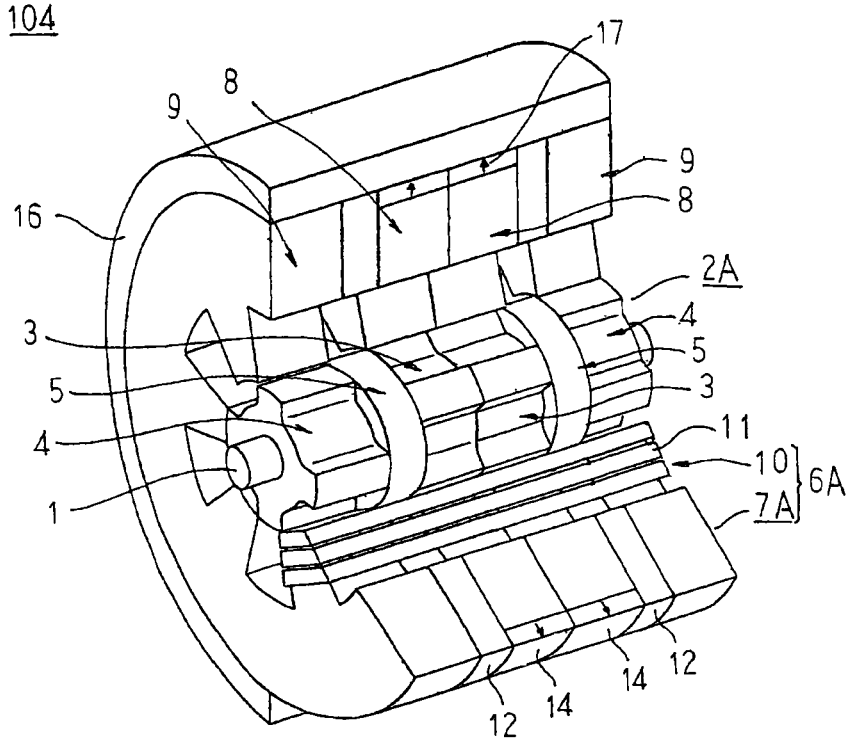
FIG. 7 is a partially cut away perspective that shows a rotary electric motor according to Embodiment 5 of the present invention.
Figure 8:
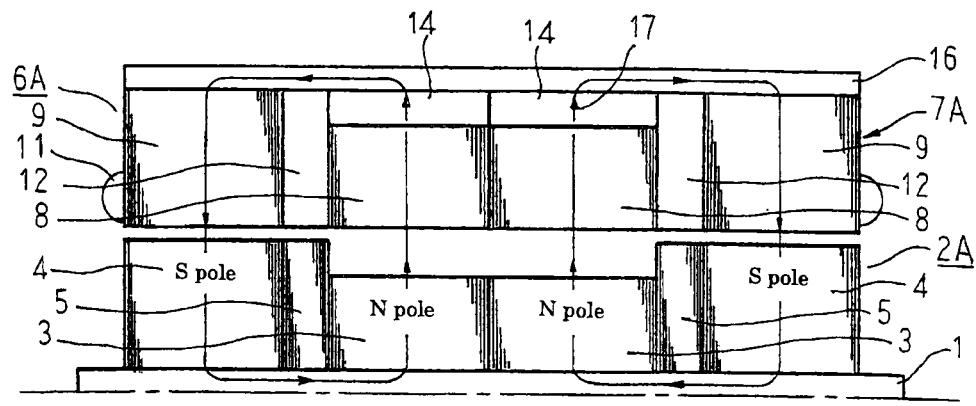
FIG. 8 is a longitudinal cross section that explains flow of magnetic flux in the rotary electric motor according to Embodiment 5 of the present invention.

FIG. 7 is a partially cut away perspective that shows a rotary electric motor according to Embodiment 5 of the present invention, and FIG. 8 is a longitudinal cross section that explains flow of magnetic flux in the rotary electric motor according to Embodiment 5 of the present invention.

In FIG. 7, a stator 6A includes: a stator core 7A; and a stator coil 10. The stator core 7A is configured such that two first core pairs of first and second stator cores 8 and 9 that are disposed coaxially on opposite sides of a spacer 12 such that circumferential positions of teeth 8b and 9b are aligned are arranged coaxially in an axial direction so as to place the first stator cores 8 in close contact with each other and such that the circumferential positions of the teeth 8b are aligned. In addition, the stator core 7A is housed and held inside the frame 16 with first permanent magnets 14 mounted. Here, the first permanent magnets 14 are fitted so as to surround the respective first stator cores 8.

The stator coil 10 has six phase coils 11 that are each formed by winding conducting wires onto sets of teeth 8b and 9b that are arranged in a single row axially without spanning the slots 8c and 9c. In FIG. 7, only a single phase coil 11 that is wound in a concentrated winding on one set of teeth 8b and 9b is shown, but the stator coil 10 is actually configured by winding three phases (U, V, and W) sequentially in concentrated windings and then repeating for a second time, on six sets of teeth 8b and 9b.

A rotor 2A is configured by disposing two rotor core pairs in which first and second rotor cores 3 and 4 are disposed in close proximity to each other on opposite sides of a partitioning wall 5 so as to be offset circumferentially by a pitch of half a salient pole, the two rotor core pairs being lined up axially so as to place the first rotor cores 3 in close contact with each other, and such that the circumferential positions of the salient poles 3b are aligned in an axial direction, and fixing them to a rotating shaft 1 that is inserted through rotating shaft insertion apertures thereof. This rotor 2A is rotatably disposed inside the stator core 7A such that the first rotor cores 3 are positioned on inner peripheral sides of the first stator cores 8, and the second rotor cores 4 are positioned on inner peripheral sides of the second stator cores 9.

Moreover, the rest of the configuration is configured in a similar manner to Embodiment 1 above.

In a rotary electric motor 104 that has been configured in this manner, as indicated by arrows in FIG. 8, a magnetic path is formed in each of the core pairs that are constituted by the first and second stator cores 8 and 9 in which magnetic flux flows from the first permanent magnet 14 through the frame 16 toward the second stator core 9, then flows from the frame 16 through the second stator core 9, the second rotor core 4, the partitioning wall 5, and the rotating shaft 1 to the first rotor core 3, and then from the first rotor core 3 through the first stator core 8 and returns to the first permanent magnet 14.

Consequently, similar effects to those in Embodiment 1 above are also exhibited in Embodiment 5. According to Embodiment 5, because the magnetic flux from the first permanent magnets 14 branches off and flows through the frame 16 in two axial directions, the amount of magnetic flux per pole is reduced. As a result, the frame 16 is less likely to become magnetically saturated even if the radial thickness thereof is reduced, enabling the diameter of the frame 16 to be reduced. Reductions in the diameter of the rotary electric motor 104 thereby become possible.

Now, in Embodiment 5 above, two first core pairs that are constituted by first and second stator cores 8 and 9 are disposed so as to line up axially next to each other so as to place the first stator cores 8 in close contact with each other, but the two first core pairs may also be disposed so as to line up axially such that the first stator cores 8 are placed next to each other so as to have a spacer, etc., interposed that is made of a nonmagnetic material. In that case, the first rotor cores 3 are also disposed so as to line up axially with each other so as to be placed next to each other with a spacer, etc., interposed that is constituted by a non-magnetic body.

In Embodiment 5 above, two first core pairs that are constituted by first and second stator cores 8 and 9 are disposed so as to line up axially next to each other so as to place the first stator cores 8 in close contact with each other, but the two first core pairs may be disposed so as to line up axially such that the second stator cores 9 are placed next to each other in close contact with each other.

In Embodiment 5 above, two first core pairs that are constituted by first and second stator cores 8 and 9 are disposed so as to line up axially, but the number of first core pairs disposed so as to line up axially may also be three or more. In that case, the three or more first core pairs are disposed so as to line up axially such that the first stator cores 8 are placed next to each other or the second stator cores 9 are placed next to each other such that circumferential positions of teeth are aligned.

Moreover, in Embodiments 1 through 5 above, the first permanent magnets are magnetically oriented such that the direction of magnetization is directed radially outward, but first permanent magnets may also be magnetically oriented such that the direction of magnetization is directed radially inward. Now, in Embodiment 2, it is necessary to change the direction of magnetization of the third permanent magnet that is interposed between the first permanent magnets and the core back of the second stator core depending on the direction of magnetization of the first permanent magnet. Specifically, if the direction of magnetization of the first permanent magnets is directed radially outward, the direction of magnetization of the third permanent magnet is magnetically oriented so as to be directed from the first permanent magnet toward the core back of the second stator core, and if the direction of magnetization of the first permanent magnets is directed radially inward, the direction of magnetization of the third permanent magnet is magnetically oriented so as to be directed from the core back of the second stator core toward the first permanent magnet.

Embodiment 6

Figure 9:
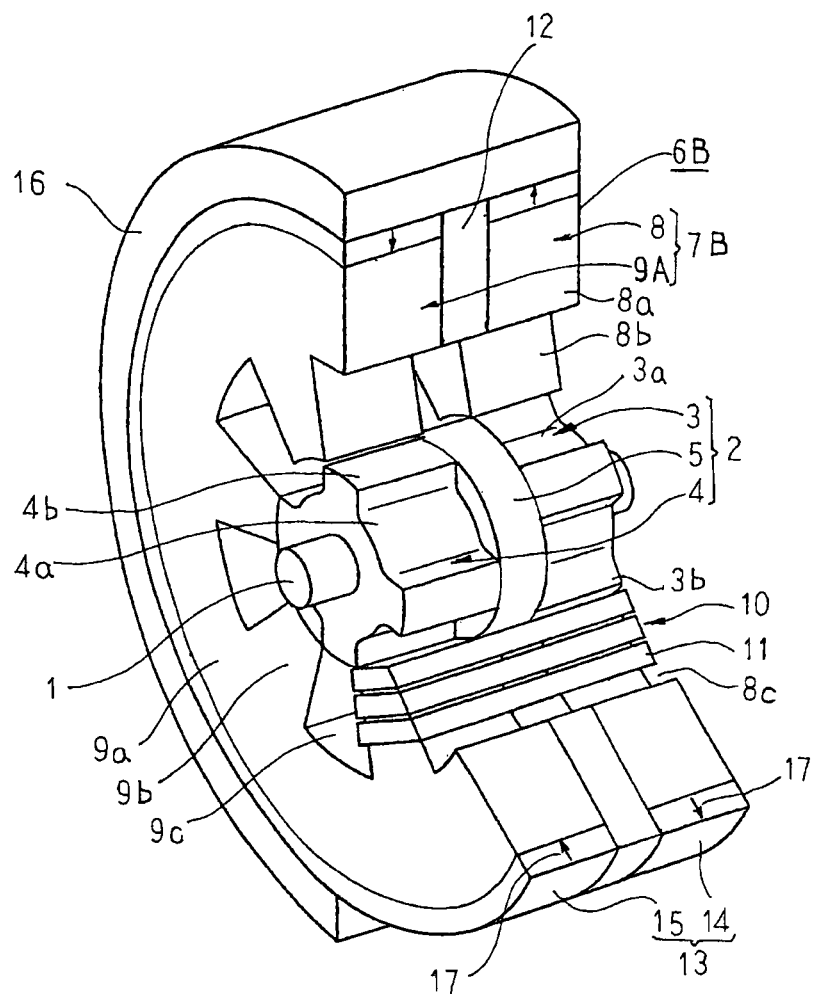
FIG. 9 is a partially cut away perspective that shows a rotary electric motor according to Embodiment 6 of the present invention.
Figure 10:
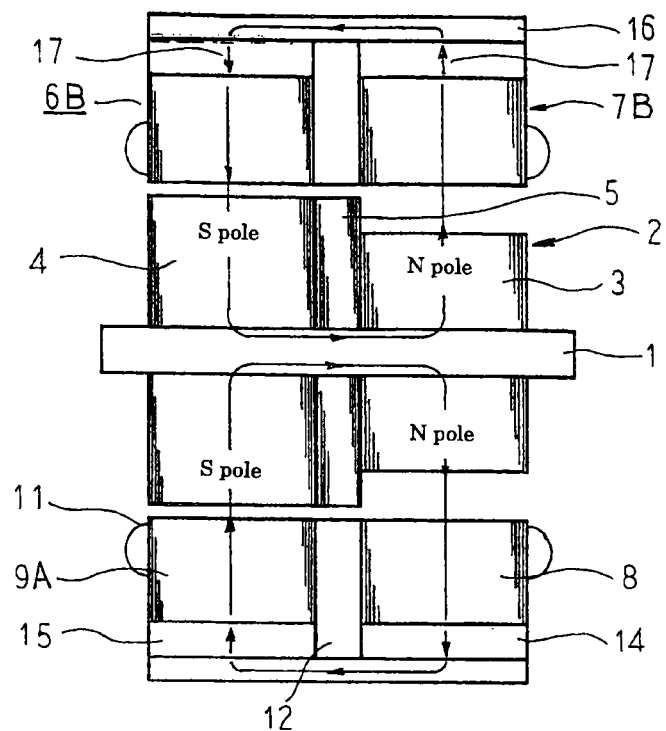
FIG. 10 is a longitudinal cross section that explains flow of magnetic flux in the rotary electric motor according to Embodiment 6 of the present invention.

FIG. 9 is a partially cut away perspective that shows a rotary electric motor according to Embodiment 6 of the present invention, and FIG. 10 is a longitudinal cross section that explains flow of magnetic flux in the rotary electric motor according to Embodiment 6 of the present invention.

In FIGS. 9 and 10, a rotary electric motor 105 is a synchronous rotary machine that has permanent magnets, and includes: a rotor 2 that is fixed coaxially to a rotating shaft 1 that is prepared using a magnetic material; a stator 6B that is formed by mounting a stator coil 10 that functions as a torque generating driving coil to a stator core 7B that is disposed coaxially so as to surround the rotor 2; a field magnetomotive force generating means 13 that generates a field magnetomotive force; and a frame 16 that houses and holds the rotor 2, the stator 6B, and the field magnetomotive force generating means 13 internally. Here, the frame 16 is prepared into a cylindrical shape, for example, using a magnetic material such as iron, etc., and also functions as an axial magnetic path forming member.

The rotor 2 includes: first and second rotor cores 3 and 4 that are prepared, for example, by laminating and integrating a large number of magnetic steel plates that are formed into a predetermined shape; and a disk-shaped partitioning wall 5 that is prepared by laminating and integrating a predetermined number of magnetic steel plates, and through a central axial position of which a rotating shaft insertion aperture is disposed. The first and second rotor cores 3 and 4 are prepared into identical shapes, and are constituted by: cylindrical base portions 3a and 4a through a central axial position of which a rotating shaft insertion aperture is disposed; and four, for example, salient poles 3b and 4b that are disposed so as to project radially outward from outer circumferential surfaces of the base portions 3a and 4a, are disposed so as to extend axially, and are disposed at a uniform angular pitch circumferentially. The first and second rotor cores 3 and 4 are offset circumferentially by a pitch of half a salient pole, are disposed in close proximity facing each other so as to have the partitioning wall 5 interposed, and are fixed to the rotating shaft 1 that is inserted into their rotating shaft insertion apertures to configure the rotor 2.

The stator core 7B includes first and second stator cores 8 and 9A that are prepared so as to have axial thicknesses equal to those of the first and second rotor cores 3 and 4 by laminating and integrating a large number of magnetic steel plates that are formed so as to have a predetermined shape. The first stator core 8 includes: a cylindrical core back 8a; and six, for example, teeth 8b that are disposed so as to project radially inward from an inner peripheral surface of the core back 8a at a uniform angular pitch circumferentially. Slots 8c that have openings on an inner peripheral side are partitioned off between circumferentially adjacent teeth 8b. The second stator core 9A is prepared into an identical shape to the first stator core 8, and includes: a cylindrical core back 9a; and six, for example, teeth 9b that are disposed so as to project radially inward from an inner peripheral surface of the core back 9a at a uniform angular pitch circumferentially. Slots 9c that have openings on an inner peripheral side are partitioned off between circumferentially adjacent teeth 9b.

A spacer 12 is prepared into a cylindrical body that has an axial thickness equal to that of the partitioning wall 5 and a radial dimension equal to that of the core backs 8a and 9a using a metal material such as a stainless alloy or aluminum, etc., and a nonmagnetic material such as a synthetic resin, etc., such as a polyphenylene sulfide resin, etc. The field magnetomotive force generating means 13 is constituted by: a first permanent magnet 14 that is prepared into a cylindrical body that has an axial thickness equal to that of the first stator core 8 and an inside diameter that is equal to the outside diameter of the first stator core 8, and is magnetically oriented such that a direction of magnetization 17 thereof is radially outward; and a second permanent magnet 15 that is prepared into a cylindrical body that has an axial thickness equal to that of the second stator core 9A and an inside diameter that is equal to the outside diameter of the second stator core 9A, and is magnetically oriented such that a direction of magnetization 17 thereof is radially inward.

First and second stator cores 8 and 9A that have been configured in this manner are disposed coaxially on opposite sides of the spacer 12 such that the circumferential position of the teeth 8b and 9b are aligned, and constitute a first core pair. The first and second rotor cores 3 and 4 are disposed so as to be positioned on an inner peripheral side of the first and second stator cores 8 and 9A, respectively. In addition, the first and second permanent magnets 14 and 15 are fitted so as to surround the first and second stator cores 8 and 9A, respectively.

The stator coil 10 has six phase coils 11 that are mounted by winding conducting wires onto teeth 8b and 9b that form pairs that face each other axially without spanning the slots 8c and 9c in a "concentrated winding method". In FIG. 9, only a single phase coil 11 that is wound in a concentrated winding on a single pair of teeth 8b and 9b is shown, but the stator coil 10 is actually configured by winding three phases (U, V, and W) sequentially in concentrated windings and then repeating for a second time, on six pairs of teeth 8b and 9b.

The rotary electric motor 105 is configured such the stator 6 is press-fitted and held inside the frame 16 with the first and second permanent magnets 14 and 15 mounted, and the rotor 2 is rotatably housed inside the stator 6 such that the rotating shaft 1 is rotatably supported by a pair of end plates (not shown). Here, an outer peripheral surface of the first permanent magnet 14 and an outer peripheral surface of the second permanent magnet 15 are linked by the frame 16.

In this rotary electric motor 105, as indicated by arrows in FIG. 10, a magnetic path is formed in which magnetic flux from the field magnetomotive force generating means 13 flows from the first permanent magnet 14 through the frame 16 toward the second permanent magnet 15, then flows from the second permanent magnet 15 through the second stator core 9A, the second rotor core 4, the partitioning wall 5, and the rotating shaft 1 to the first rotor core 3, and then from the first rotor core 3 through the first stator core 8 and returns to the first permanent magnet 14. Thus, North-seeking (N) poles arise in the salient poles 3b of the first rotor core 3, and South-seeking (S) poles arise in the salient poles 4b of the second rotor core 4. Here, because the salient poles 3b and 4b of the first and second rotor cores 3 and 4 are offset by a pitch of half a salient pole circumferentially, the N poles and the S poles are disposed alternately in a circumferential direction when viewed from an axial direction. The magnetic flux from the field magnetomotive force generating means 13 and the magnetic flux from the stator coil 10 interact to generate torque. The rotary electric motor 105 operates as a noncommutator motor, and operates magnetically in a similar manner to that of a concentrated winding permanent-magnet dynamoelectric machine that has eight poles and six slots.

In Embodiment 6, because the first and second permanent magnets 14 and 15 are prepared into cylindrical bodies that surround the first and second stator cores 8 and 9A, and are magnetically oriented in radial directions, magnetic path cross sections that are perpendicular to the directions of magnetization 17 of the first and second permanent magnets 14 and 15 are cylindrical surfaces that are centered around the central axis of the rotating shaft 1. Thus, magnet cross-sectional area perpendicular to the directions of magnetization 17 of the first and second permanent magnets 14 and 15 can be increased by increasing axial dimensions without increasing radial dimensions. Consequently, because the amount of effective magnetic flux can be ensured by increasing magnet cross-sectional area without increasing radial dimensions, a rotary electric motor 105 that can be used in compact, high-speed motor applications can be achieved simply.

In Embodiment 6, because the first and second permanent magnets 14 and 15 are prepared into cylindrical bodies that surround the first and second stator cores 8 and 9A, and are magnetically oriented in radial directions, and the frame 16, which is made of a magnetic material, is disposed so as to link the outer peripheral surfaces of the first and second permanent magnets 14 and 15, the first and second permanent magnets 14 and 15 are magnetically connected through the frame 16. Thus, magnetic flux from the first permanent magnet 14 enters the frame 16, flows axially through the frame 16 and reaches a second permanent magnet 15 end, and enters the second stator core 9A from a region of the frame 16 extending over an entire axial length of the second stator core 9A together with the magnetic flux from the second permanent magnet 15. The magnetic flux thereby flows approximately uniformly through each of the magnetic steel plates of the second stator core 9A. Consequently, because reductions in the amount of effective magnetic flux that result from the magnetic flux flowing biasedly toward facing end portions of the first and second stator cores 8 and 9A, i.e., toward a center of the first core pair, are suppressed, a high-efficiency rotary electric motor 100 can be achieved.

In Embodiment 6, because the first and second permanent magnets 14 and 15 are prepared into cylindrical bodies, mounting of the first and second permanent magnets 14 and 15 onto the first and second stator cores 8 and 9A is simplified, and the amount of magnetic flux can also be increased.

Because the frame 16 that is prepared using a magnetic material is used as an axial magnetic path forming member, it is not necessary to prepare an axial magnetic path forming member separately, enabling reductions in the number of parts.

Embodiment 7

Figure 11:
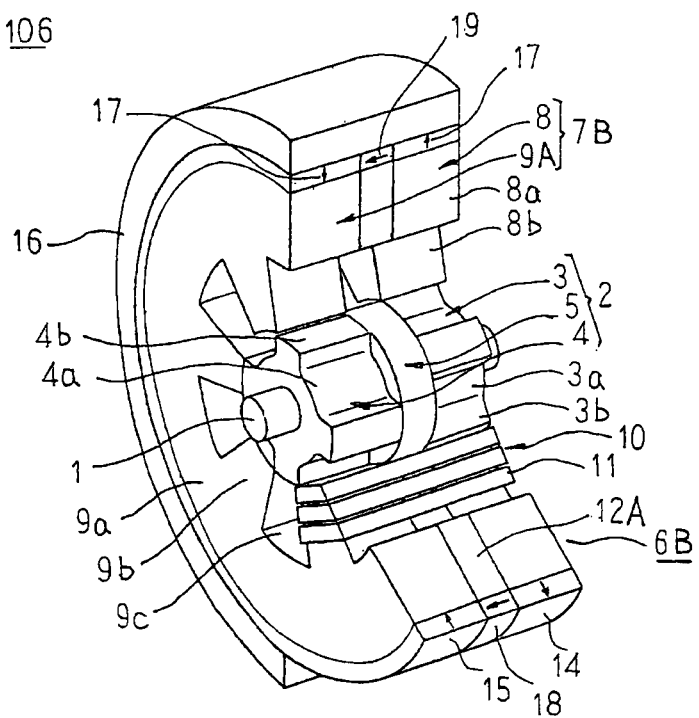
FIG. 11 is a partially cut away perspective that shows a rotary electric motor according to Embodiment 7 of the present invention.
Figure 12:
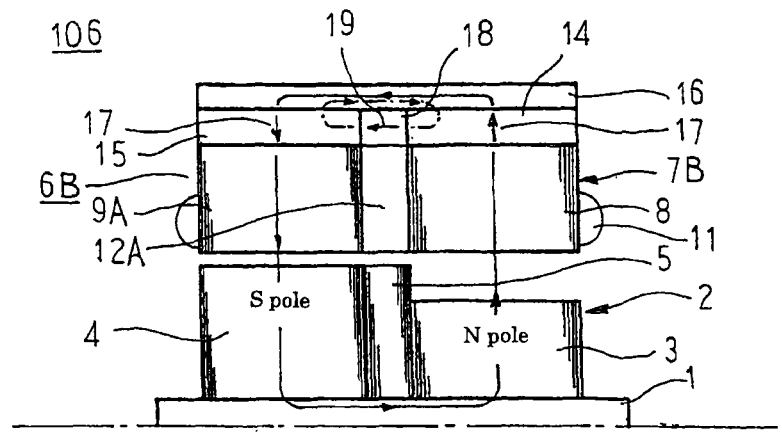
FIG. 12 is a longitudinal cross section that explains effects due to a third permanent magnet in the rotary electric motor according to Embodiment 7 of the present invention.

FIG. 11 is a partially cut away perspective that shows a rotary electric motor according to Embodiment 7 of the present invention, and FIG. 12 is a longitudinal cross section that explains effects due to a third permanent magnet in the rotary electric motor according to Embodiment 7 of the present invention.

In FIG. 11, a spacer 12A is prepared into a cylindrical body in which a radial dimension is reduced by an amount equal to a radial thickness of first and second permanent magnets 14 and 15, and a third permanent magnet 18 is prepared into a cylindrical body that has an axial length equal to that of the spacer 12A and a radial dimension that is equal to that of the first and second permanent magnets 14 and 15 is mounted so as to surround the spacer 12A, and is interposed between the first and second permanent magnets 14 and 15. The third permanent magnet 18 is magnetically oriented axially such that a direction of magnetization 19 thereof is directed from the first permanent magnet 14 toward the second permanent magnet 15.

Moreover, the rest of the configuration is configured in a similar manner to Embodiment 6 above.

In a rotary electric motor 106 that has been configured in this manner, a magnetic path is formed in which magnetic flux from the third permanent magnet 18 enters the frame 16 from the second permanent magnet 15, flows through the frame 16 toward the first permanent magnet 14, and returns to the third permanent magnet 18 through the first permanent magnet 14, as indicated by a dotted chain line in FIG. 12. Here, the magnetic flux from the third permanent magnet 18 flows through the frame 16 in a reverse direction to the magnetic flux from the field magnetomotive force generating means 13, alleviating magnetic saturation of the frame 16. In other words, the third permanent magnet 18 constitutes a magnetic saturation alleviating means for the axial magnetic path forming member.

Thus, according to Embodiment 7, because magnetic saturation of the frame 16 is alleviated, the amount of effective magnetic flux is increased, enabling output to be improved, and the frame 16 can also be made thinner, enabling reductions in size and weight of the rotary electric motor 106.

Embodiment 8

Embodiment 8 is configured in a similar manner to Embodiment 6 above except that first and second permanent magnets are constituted by a plurality of magnet bodies that are each prepared into a strip shape that has a circular arc-shaped cross section that has a predetermined thickness. Moreover, because the first and second permanent magnets are configured in a similar manner, only the first permanent magnet will be explained here, and explanation of the second permanent magnets will be omitted.

Figure 13:
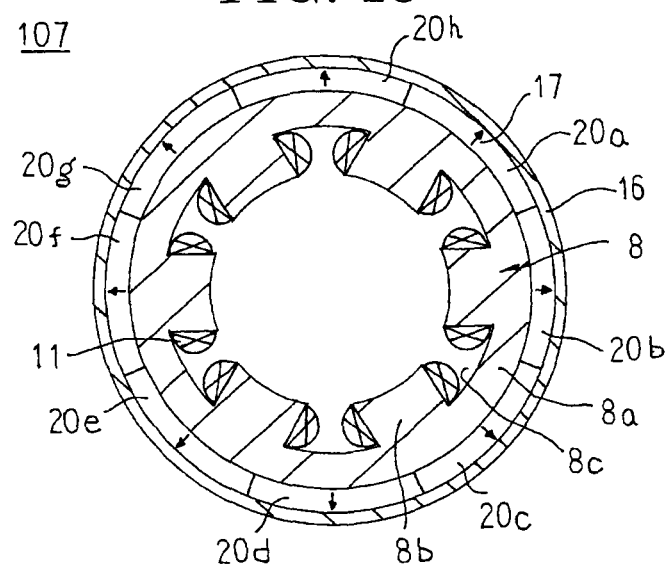
FIG. 13 is a lateral cross section that shows a rotary electric motor according to Embodiment 8 of the present invention.

FIG. 13 is a lateral cross section that shows a rotary electric motor according to Embodiment 8 of the present invention.

In FIG. 13, a first permanent magnet is constituted by strip-shaped magnet bodies 20a through 20h that have circular arc-shaped cross sections that have a shape in which a first permanent magnet 14 that has a cylindrical body described above has been divided into eight, for example, equal sections circumferentially. Each of the magnet bodies 20a through 20h is magnetically oriented such that the direction of magnetization 17 is oriented radially outward.

Now, if the permanent magnets are prepared into single cylindrical bodies, magnetic flux components that interact with the permanent magnets during rotation of the rotor fluctuate somewhat, generating eddy current loss due to the fluctuating magnetic flux in the permanent magnets together therewith.

In a rotary electric motor 107 that has been configured in this manner, because the permanent magnets are divided into a plurality of magnet bodies 20a through 20h, eddy current paths are also simultaneously divided, and eddy currents are reduced as a result, enabling eddy current loss that arises in the permanent magnets also to be reduced.

Moreover, in Embodiment 8 above, the magnet bodies 20a through 20h are arranged on an outer peripheral surface of the first stator core 8 without leaving gaps circumferentially, but a plurality of magnet bodies may also be arranged on an outer peripheral surface of a first stator core so as to have predetermined gaps circumferentially, and only one magnet body may also be disposed. If a plurality of magnet bodies are arranged circumferentially on an outer peripheral surface of a stator core, the magnetic balance will improve if they are arranged at a uniform angular pitch.

In Embodiment 8 above, the first and second permanent magnets are constituted by strip-shaped magnet bodies that have been divided into eight circumferentially, but only one of the first and second permanent magnets may also be constituted by strip-shaped magnet bodies that have been divided into eight circumferentially.

Embodiment 9

Figure 14:
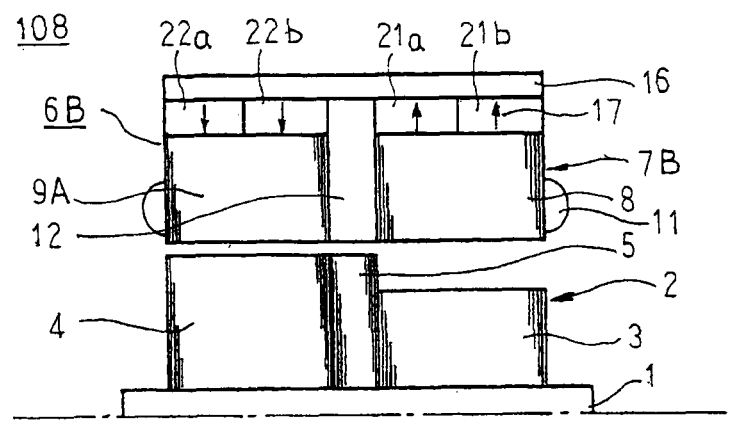
FIG. 14 is a longitudinal cross section that shows a rotary electric motor according to Embodiment 9 of the present invention.

FIG. 14 is a longitudinal cross section that shows a rotary electric motor according to Embodiment 9 of the present invention.

In FIG. 14, a first permanent magnet is constituted by first magnet bodies 21a and 21b that have cylindrical bodies that have a shape in which a first permanent magnet 14 that has a cylindrical body described above has been divided into two equal sections axially. The first magnet bodies 21a and 21b are each magnetically oriented such that the direction of magnetization 17 thereof is oriented radially outward. A second permanent magnet is constituted by second magnet bodies 22a and 22b that have cylindrical bodies that have a shape in which a second permanent magnet 15 that has a cylindrical body described above has been divided into two equal sections axially. The second magnet bodies 22a and 22b are each magnetically oriented such that the direction of magnetization 17 thereof is oriented radially inward.

Moreover, Embodiment 9 is configured in a similar manner to Embodiment 6 above except that the first and second permanent magnets are constituted by a plurality of magnet bodies that are each prepared into a cylindrical body.

In a rotary electric motor 108 that has been configured in this manner, the first magnet bodies 21a and 21b are fitted so as to surround the first stator core 8 such that directions of magnetization 17 thereof are oriented radially outward and so as to be adjacent in an axial direction. The second magnet bodies 22a and 22b are fitted so as to surround the second stator core 9A such that directions of magnetization 17 thereof are oriented radially inward and so as to be adjacent in an axial direction.

Consequently, in this rotary electric motor 108 eddy current paths are also divided by dividing the permanent magnets, enabling permanent magnet eddy current loss to be reduced.

Moreover, in Embodiment 9 above, first and second permanent magnets are constituted by magnet bodies that have cylindrical bodies that have been divided into two sections axially, but the first and second permanent magnets may also be divided into three or more sections axially. Each of the magnet bodies may also be disposed so as to leave gaps axially.

In Embodiment 9 above, the first and second permanent magnets are constituted by magnet bodies that have cylindrical bodies that have been divided into two sections axially, but only one of the first and second permanent magnets may also be constituted by magnet bodies that have cylindrical bodies that have been divided into two sections axially.

Embodiment 10

Figure 15:
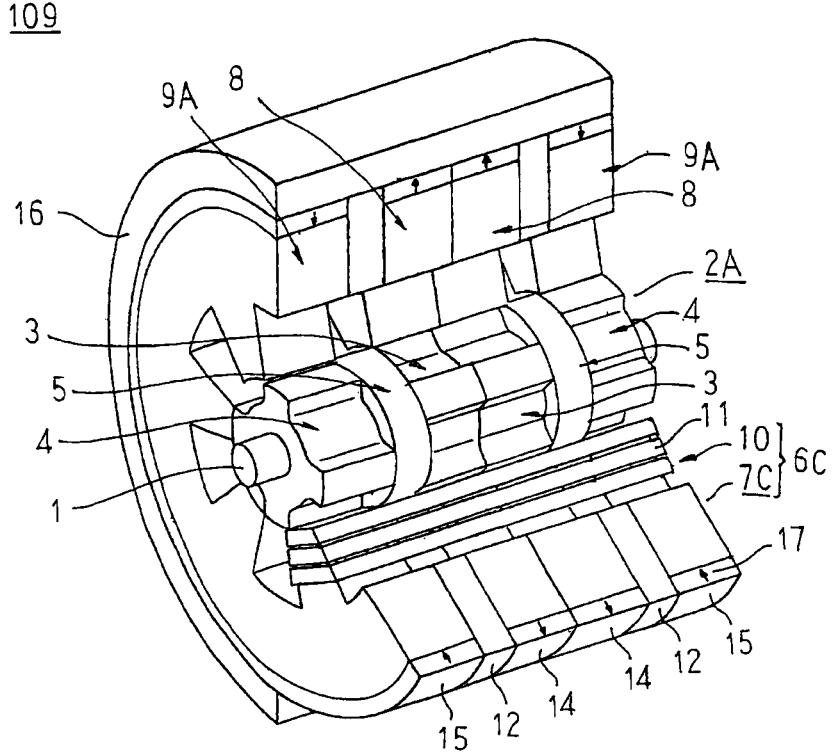
FIG. 15 is a partially cut away perspective that shows a rotary electric motor according to Embodiment 10 of the present invention.
Figure 16:
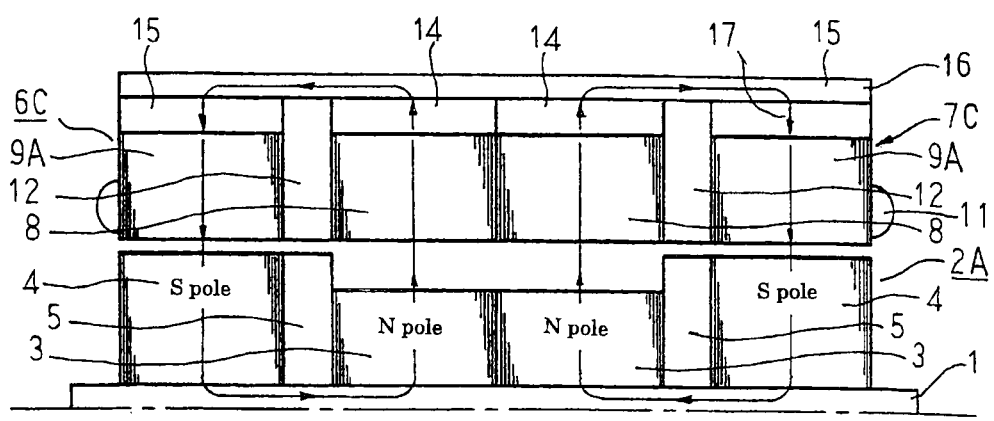
FIG. 16 is a longitudinal cross section that explains flow of magnetic flux in the rotary electric motor according to Embodiment 10 of the present invention.

FIG. 15 is a partially cut away perspective that shows a rotary electric motor according to Embodiment 10 of the present invention, and FIG. 16 is a longitudinal cross section that explains flow of magnetic flux in the rotary electric motor according to Embodiment 10 of the present invention.

In FIG. 15, a stator 6C includes: a stator core 7C; and a stator coil 10. The stator core 7C is configured by arranging coaxially in an axial direction two first core pairs of first and second stator cores 8 and 9A that are disposed coaxially on opposite sides of the spacer 12 such that circumferential positions of teeth 8b and 9b are aligned so as to place the first stator cores 8 in close contact with each other, and such that the circumferential positions of the teeth 8b are aligned. In addition, the stator core 7C is housed and held inside the frame 16 with first permanent magnets 14 and second permanent magnets 15 mounted. Here, the first permanent magnets 14 are fitted so as to surround the respective first stator cores 8, and the second permanent magnets 15 are fitted so as to surround the respective second stator cores 9A.

The stator coil 10 has six phase coils 11 that are each formed by winding conducting wires onto sets of teeth 8b and 9b that are arranged in a single row axially without spanning the slots 8c and 9c. In FIG. 15, only a single phase coil 11 that is wound in a concentrated winding on one set of teeth 8b and 9b is shown, but the stator coil 10 is actually configured by winding three phases (U, V, and W) sequentially in concentrated windings and then repeating for a second time, on six sets of teeth 8b and 9b.

A rotor 2A is configured by disposing two rotor core pairs in which first and second rotor cores 3 and 4 are disposed in close proximity to each other on opposite sides of a partitioning wall 5 so as to be offset circumferentially by a pitch of half a salient pole, the two rotor core pairs being lined up axially so as to place the first rotor cores 3 in close contact with each other, and such that the circumferential positions of the salient poles 3b are aligned in an axial direction, and fixing them to a rotating shaft 1 that is inserted through rotating shaft insertion apertures thereof. This rotor 2A is rotatably disposed inside the stator core 7C such that the first rotor cores 3 are positioned on inner peripheral sides of the first stator cores 8, and the second rotor cores 4 are positioned on inner peripheral sides of the second stator cores 9A.

Moreover, the rest of the configuration is configured in a similar manner to Embodiment 6 above.

In a rotary electric motor 109 that has been configured in this manner, as indicated by arrows in FIG. 16, a magnetic path is formed in each of the first core pairs that are constituted by the first and second stator cores 8 and 9A in which magnetic flux flows from the first permanent magnet 14 through the frame 16 to the second permanent magnet 15, then flows from the second permanent magnet 15 through the second stator core 9A, the second rotor core 4, the partitioning wall 5, and the rotating shaft 1 to the first rotor core 3, and then from the first rotor core 3 through the first stator core 8 and returns to the first permanent magnet 14.

Consequently, similar effects to those in Embodiment 6 above are also exhibited in Embodiment 10.

According to Embodiment 10, because the magnetic flux from the first permanent magnets 14 branches off and flows through the frame 16 in two axial directions, the amount of magnetic flux per pole is reduced. As a result, the frame 16 is less likely to become magnetically saturated even if the radial thickness thereof is reduced, enabling the diameter of the frame 16 to be reduced. Reductions in the diameter of the rotary electric motor 109 thereby become possible.

Now, in Embodiment 10 above, two first core pairs that are constituted by first and second stator cores 8 and 9A are disposed so as to line up axially next to each other so as to place the first stator cores 8 in close contact with each other, but the two first core pairs may also be disposed so as to line up axially such that the first stator cores 8 are placed next to each other so as to have a spacer, etc., interposed that is made of a nonmagnetic material. In that case, the first rotor cores 3 are also disposed so as to line up axially with each other so as to be placed next to each other with a spacer, etc., interposed that is constituted by a non-magnetic body.

In Embodiment 10 above, two first core pairs that are constituted by first and second stator cores 8 and 9A are disposed so as to line up axially next to each other so as to place the first stator cores 8 in close contact with each other, but the two first core pairs may be disposed so as to line up axially such that the second stator cores 9A are placed next to each other in close contact with each other.

In Embodiment 10 above, two first core pairs that are constituted by first and second stator cores 8 and 9A are disposed so as to line up axially, but the number of first core pairs disposed so as to line up axially may also be three or more. In that case, the three or more core pairs are disposed so as to line up axially such that the first stator cores 8 are placed next to each other or the second stator cores 9A are placed next to each other such that circumferential positions of teeth are aligned.

Moreover, in Embodiments 1 through 10 above, the first and second stator cores are prepared by laminating magnetic steel plates, but the first and second stator cores are not limited to laminated cores that are formed by laminating magnetic steel plates, and, for example, dust cores may also be used that are obtained by subjecting a magnetic metal powder to an insulating treatment, and then pressure forming and applying a heat treatment thereto.

In Embodiments 1 through 10 above, a frame that is prepared using a magnetic material is used as an axial magnetic path forming member, but the axial magnetic path forming member need only be prepared using a magnetic material so as to be continuous in an axial direction, and, for example, magnetic members may also be used that are prepared into strip shapes using a magnetic material. In that case, the strip-shaped magnetic members should be disposed so as to extend axially so as to link outer peripheral surfaces of first permanent magnets and outer peripheral surfaces of second permanent magnets.

Embodiment 11

Figure 17:
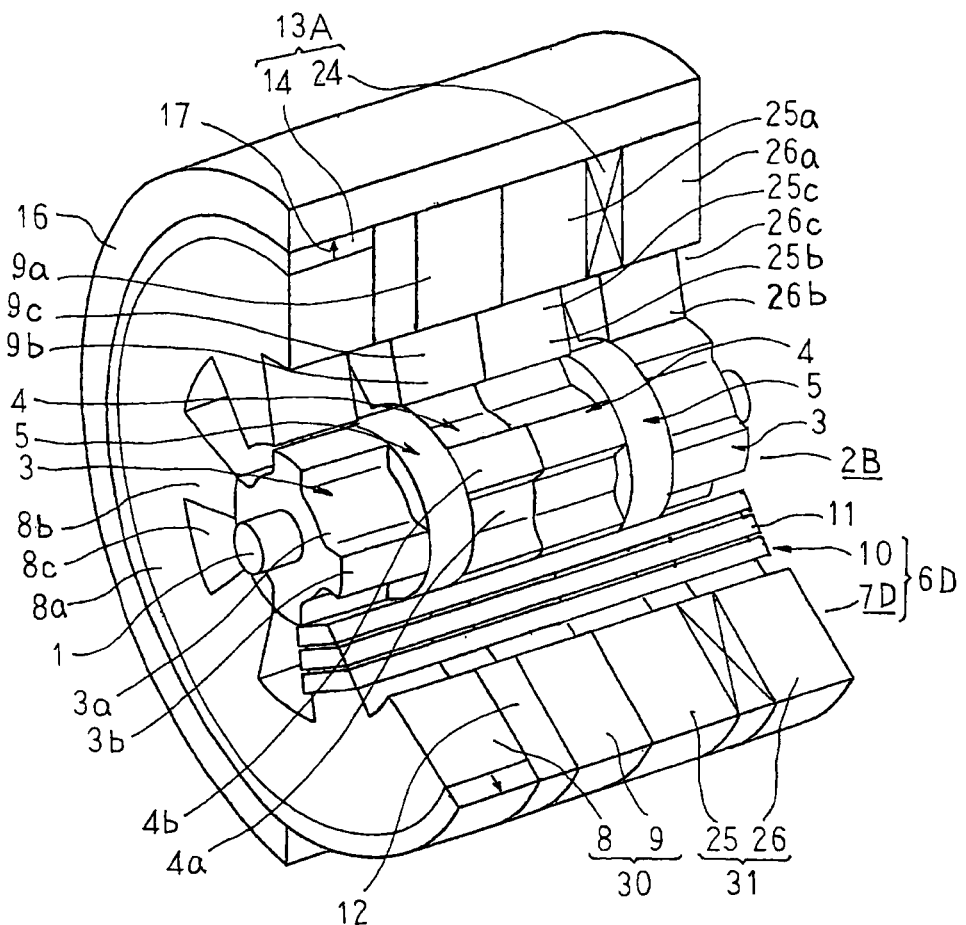
FIG. 17 is a partially cut away perspective that shows a rotary electric motor according to Embodiment 11 of the present invention.
Figure 18:
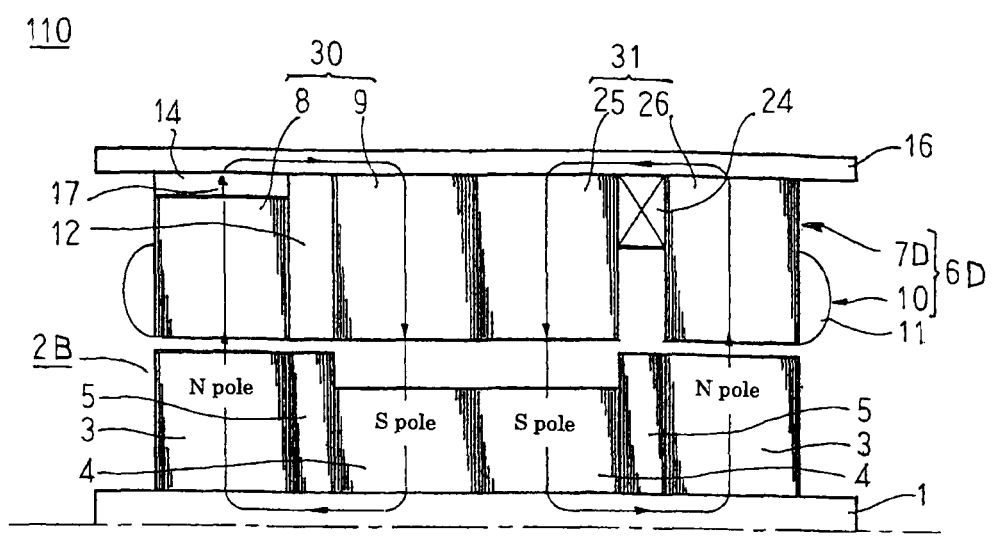
FIG. 18 is a longitudinal cross section that explains flow of magnetic flux in the rotary electric motor according to Embodiment 11 of the present invention.

FIG. 17 is a partially cut away perspective that shows a rotary electric motor according to Embodiment 11 of the present invention, and FIG. 18 is a longitudinal cross section that explains flow of magnetic flux in the rotary electric motor according to Embodiment 11 of the present invention.

In FIGS. 17 and 18, a rotary electric motor 110 is a synchronous rotary machine that has permanent magnets, and includes: a rotor 2B that is fixed coaxially to a rotating shaft 1 that is prepared using a magnetic material; a stator 6D that is formed by mounting a stator coil 10 that functions as a torque generating driving coil to a stator core 7D that is disposed coaxially so as to surround the rotor 2B; a field magnetomotive force generating means 13A that generates a field magnetomotive force; and a frame 16 that houses and holds the rotor 2B, the stator 6D, and the field magnetomotive force generating means 13A internally. Here, the frame 16 is prepared into a cylindrical shape, for example, using a magnetic material such as iron, etc., and also functions as an axial magnetic path forming member.

The rotor 2B is constituted by two rotor core pairs. Each of the rotor core pairs includes: first and second rotor cores 3 and 4 that are prepared, for example, by laminating and integrating a large number of magnetic steel plates that are formed into a predetermined shape; and a disk-shaped partitioning wall 5 that is prepared by laminating and integrating a predetermined number of magnetic steel plates, and through a central axial position of which a rotating shaft insertion aperture is disposed. The first and second rotor cores 3 and 4 are prepared into identical shapes, and are constituted by: cylindrical base portions 3a and 4a through a central axial position of which a rotating shaft insertion aperture is disposed; and four, for example, salient poles 3b and 4b that are disposed so as to project radially outward from outer circumferential surfaces of the base portions 3a and 4a, are disposed so as to extend axially, and are disposed at a uniform angular pitch circumferentially. The rotor core pairs is configured such that the first and second rotor cores 3 and 4 are offset circumferentially by a pitch of half a salient pole, and are disposed in close proximity facing each other so as to have the partitioning wall 5 interposed. The rotor 2B is configured such that the two rotor core pairs are disposed so as to line up axially so as to place the second rotor cores 4 in close proximity with each other, and so as to be fixed to a rotating shaft 1 that is inserted through rotating shaft insertion apertures of the first and second rotor cores 3 and 4 and the partitioning wall 5.

The stator core 7D includes first through fourth stator cores 8, 9, 25, and 26 that are prepared so as to have axial thicknesses equal to those of the first and second rotor cores 3 and 4 by laminating and integrating a large number of magnetic steel plates that are formed so as to have a predetermined shape. The first stator core 8 includes: a cylindrical core back 8a; and six, for example, teeth 8b that are disposed so as to project radially inward from an inner peripheral surface of the core back 8a at a uniform angular pitch circumferentially. Slots 8c that have openings on an inner peripheral side are partitioned off between circumferentially adjacent teeth 8b. The second stator core 9 includes: a cylindrical core back 9a; and six, for example, teeth 9b that are disposed so as to project radially inward from an inner peripheral surface of the core back 9a at a uniform angular pitch circumferentially. Slots 9c that have openings on an inner peripheral side are partitioned off between circumferentially adjacent teeth 9b. Here, the second stator core 9 is prepared so as to have a similar shape to that of the first stator core 8 except that its outside diameter is increased by an amount equivalent to a thickness of the first permanent magnet 14.

The third stator core 25 includes: a cylindrical core back 25a; and six, for example, teeth 25b that are disposed so as to project radially inward from an inner peripheral surface of the core back 25a at a uniform angular pitch circumferentially. Slots 25c that have openings on an inner peripheral side are partitioned off between circumferentially adjacent teeth 25b. The fourth stator core 26 includes: a cylindrical core back 26a; and six, for example, teeth 26b that are disposed so as to project radially inward from an inner peripheral surface of the core back 26a at a uniform angular pitch circumferentially. Slots 26c that have openings on an inner peripheral side are partitioned off between circumferentially adjacent teeth 26b. Moreover, the third and fourth stator cores 25 and 26 are prepared into a similar shape to the second stator core 9.

A spacer 12 is prepared into a cylindrical body that has an axial thickness equal to that of the partitioning wall 5 and a radial dimension equal to that of the core back 9a using a metal material such as a stainless alloy or aluminum, etc., and a nonmagnetic material such as a synthetic resin, etc., such as a polyphenylene sulfide resin, etc.

The first permanent magnet 14 is prepared into a cylindrical body that has an axial thickness equal to that of the first stator core 8 and an inside diameter that is equal to the outside diameter of the first stator core 8, and is magnetically oriented such that a direction of magnetization 17 thereof is radially outward. The field coil 24 is a cylindrical coil that is prepared by winding a conducting wire for a predetermined number of turns. The first permanent magnet 14 and the field coil 24 constitute the field magnetomotive force generating means 13A.

The first and second stator cores 8 and 9 are disposed coaxially on opposite sides of the spacer 12 such that the circumferential position of the teeth 8b and 9b are aligned, and constitute a first core pair 30. The third and fourth stator cores 25 and 26 are disposed coaxially on opposite sides of the field coil 24 such that the circumferential position of the teeth 25b and 26b are aligned, and constitute a second core pair 31. The first core pair 30 and the second core pair 31 are disposed so as to line up coaxially circumferential positions of the teeth 8b, 9b, 25b, and 26b are aligned, and so as to place the second stator core 9 and the third stator core 25 in close contact to constitute the stator core 7D. In addition, the first permanent magnet 14 is fitted so as to surround the first stator core 8.

The stator coil 10 has six phase coils 11 that are formed by winding conducting wires onto four teeth 8b, 9b, 25b, and 26b that are arranged in a single row axially without spanning the slots 8c, 9c, 25c, and 26c in a "concentrated winding method". In FIG. 17, only a single phase coil 11 that is wound in a concentrated winding on one set of teeth 8b, 9b, 25b, and 26b is shown, but the stator coil 10 is actually configured by winding three phases (U, V, and W) sequentially in concentrated windings and then repeating for a second time, on six sets of teeth 8b, 9b, 25b, and 26b.

The rotary electric motor 110 is configured such the stator 6D is press-fitted and held inside the frame 16 with the first permanent magnet 14 and the field coil 24 mounted, and the rotor 2B is rotatably housed inside the stator 6D such that the rotating shaft 1 is rotatably supported by a pair of end plates (not shown). Here, an outer peripheral surface of the first permanent magnet 14 and an outer peripheral surface of the core back 9a of the second stator core 9 are magnetically linked by the frame 16. An outer peripheral surface of the core back 25a of the third stator core 25 and an outer peripheral surface of the core back 26a of the fourth stator core 26 are also magnetically linked by the frame 16. The first to fourth stator cores 8, 9, 25, and 26 surround the first rotor core 3, the second rotor core 4, the second rotor core 4, and the first rotor core 3, respectively.

In this rotary electric motor 110, as indicated by arrows in FIG. 18, a magnetic path is formed in which magnetic flux from the first permanent magnet 14, which constitutes a field magnetomotive force generating means 13A, flows from the first permanent magnet 14 through the frame 16 to the second stator core 9, then flows from the second stator core 9, through the second rotor core 4, the partitioning wall 5, and the rotating shaft 1 to the first rotor core 3, and then from the first rotor core 3 through the first stator core 8 and returns to the first permanent magnet 14. As indicated by arrows in FIG. 18, a magnetic path is also formed in which magnetic flux from the field coil 24, which constitutes a field magnetomotive force generating means 13A, flows from the fourth stator core 26 through the frame 16 to the third stator core 25, then flows from the third stator core 25, through the second rotor core 4, the partitioning wall 5, and the rotating shaft 1 to the first rotor core 3, and then from the first rotor core 3 returns to the fourth stator core 26. Thus, North-seeking (N) poles arise in the salient poles 3b of the first rotor core 3, and South-seeking (S) poles arise in the salient poles 4b of the second rotor core 4.

Here, because the salient poles 3b and 4b of the first and second rotor cores 3 and 4 are offset by a pitch of half a salient pole circumferentially, the N poles and the S poles are disposed alternately in a circumferential direction when viewed from an axial direction. The magnetic flux from the field magnetomotive force generating means 13A and the magnetic flux from the stator coil 10 interact to generate torque. The rotary electric motor 110 operates as a noncommutator motor, and operates magnetically in a similar manner to that of a concentrated winding permanent-magnet dynamoelectric machine that has eight poles and six slots. By changing the amount of field current to the field coil 24 and the direction of passage of electric current, the amount of magnetic flux and the direction of flow of magnetic flux can be changed to adjust the magnetomotive force from the field magnetomotive force generating means 13A.

In Embodiment 11, because the first permanent magnet 14 is prepared into a cylindrical body that surrounds the first stator core 8, and is magnetically oriented in a radial direction, a magnetic path cross section that is perpendicular to the direction of magnetization 17 of the first permanent magnet 14 is a cylindrical surface that is centered around the central axis of the rotating shaft 1. Thus, magnet cross-sectional area perpendicular to the direction of magnetization 17 of the first permanent magnet 14 can be increased by increasing axial dimensions without increasing radial dimensions. Consequently, because the amount of effective magnetic flux can be ensured by increasing magnet cross-sectional area without increasing radial dimensions, a rotary electric motor 110 that can be used in compact, high-speed motor applications can be achieved simply.

Because the first permanent magnet 14 is prepared into a cylindrical body that surrounds the first stator core 8, and is magnetically oriented in a radial direction, and the frame 16, which is made of a magnetic material, is disposed so as to link the outer peripheral surface of the first permanent magnet 14 and the outer peripheral surface of the second stator core 9, magnetic flux from the first permanent magnet 14 enters the frame 16, flows axially through the frame 16 and reaches a second stator core 9 end, and enters the second stator core 9 from a region of the frame 16 extending over an entire axial length of the second stator core 9. The magnetic flux thereby flows approximately uniformly through each of the magnetic steel plates of the second stator core 9. Because the field coil 24 is interposed between the third and fourth stator cores 25 and 26, the magnetic flux from the field coil 24 flows approximately uniformly in each of the magnetic steel plates of the third and fourth stator cores 25 and 26. Consequently, because reductions in the amount of effective magnetic flux that result from the magnetic flux flowing biasedly toward ends of the first and second stator cores 8 and 9 near the spacer 12 and ends of the third and fourth stator cores 25 and 26 near the field coil 24, i.e., toward centers of the first core pair 30 and the second core pair 31, are suppressed, a high-efficiency rotary electric motor 110 can be achieved.

Because the third and fourth stator cores 25 and 26 that have the field coil 24 interposed are disposed side by side with the first and second stator cores 8 and 9 to which the first permanent magnet 14 is mounted, increases in outside diameter are suppressed, and magnetomotive force from the field magnetomotive force generating means 13A can be adjusted.

Because the first permanent magnet 14 is prepared into a cylindrical body, mounting of the first permanent magnet 14 onto the first stator core 8 is simplified, and the amount of magnetic flux can also be increased.

Because the frame 16 that is prepared using a magnetic material is used as an axial magnetic path forming member, it is not necessary to prepare an axial magnetic path forming member separately, enabling reductions in the number of parts.

Next, effects of combining use of the first permanent magnet 14 and the field coil 24 as the field magnetomotive force generating means 13A will be explained.

First, if only a permanent magnet, which has high efficiency and high power, is used as the field magnetomotive force generating means, large reverse electromotive forces arise during high-speed operation, making constant output operation impossible. Thus, in order to achieve constant output operation at a wide range of speeds, it is necessary to reduce field magnetic flux during high-speed rotation by reducing the magnetomotive force from the permanent magnet.

In conventional techniques, it has been possible to adjust the magnetomotive force of the rotor by adding a mechanism that moves permanent magnets radially, or adding an external leakage magnetic path for the permanent magnet, etc. However, in these conventional techniques, a complicated mechanism is required to move the permanent magnets radially, and it is also necessary to ensure space for moving the permanent magnets out or space in which to form the external leakage magnetic path radially outside, giving rise to increases in the cost and size of the apparatus.

It is also conceivable to use only a field coil as the field magnetomotive force generating means. In that case, magnetomotive force can be adjusted simply by controlling the excitation current flowing to the field coil. However, increasing the size of the field coil is unavoidable in order to achieve a magnetomotive force that is equal to that of a permanent magnet, and a field power source that has a large voltage source capacity is required.

In Embodiment 11, because the first permanent magnets 14 and the field coil 24 are used in combination as the field magnetomotive force generating means 13A, magnetomotive force from the field magnetomotive force generating means 13A can be reduced to reduce field magnetic flux during high-speed rotation by reducing the amount of field current that is passed to the field coil 24, or passing the field current in a reverse direction. As a result, constant output operation can be achieved at a wide range of speeds. Here, because a mechanism that moves the permanent magnet radially is no longer necessary, suppressing enlargement of the device, a rotary electric motor can be achieved that can be used in high-speed motor applications that require reductions in outside diameter. In addition, a single field coil 24 is sufficient, enabling the amount of field current to be reduced, and also enabling the field power source to be reduced.

Moreover, in Embodiment 11 above, the direction of magnetization 17 of the first permanent magnet 14 is radially outward, but the direction of magnetization 17 of the first permanent magnet 14 may also be radially inward.

In Embodiment 11 above, the rotating shaft 1 is prepared using a magnetic material, but it is not absolutely necessary for the rotating shaft 1 to be prepared using a magnetic material provided that the rotor 2B is configured such that a sufficient amount of magnetic flux can flow from the second rotor core 4 to the first rotor core 3 without passing through the rotating shaft 1.

In Embodiment 11 above, the second rotor cores 4 are disposed next to each other in close contact with each other, but the second rotor cores 4 may also be disposed next to each other so as to leave a gap in an axial direction.

In Embodiment 11 above, the first core pair 30 and the second core pair 31 are disposed next to each other such that the second stator core 9 and the third stator core 25 are placed in close contact with each other, but the first core pair 30 and the second core pair 31 may also be disposed such that the second stator core 9 and the third stator core 25 are next to each other so as to have a spacer, etc., interposed that is made of a nonmagnetic material.

In Embodiment 11 above, the first permanent magnet 14 is disposed radially outside the first stator core 8, but the first permanent magnet 14 may also be disposed radially outside the second stator core 9. In that case, it is preferable that a gap be disposed between the adjacent second stator core 9 and third stator core 25 to avoid formation of a closed magnetic circuit in the second stator core 9, the third stator core 25, and the frame 16, and suppress reductions in the amount of magnetic flux that flows to the rotor 2B.

Embodiment 12

Figure 19:
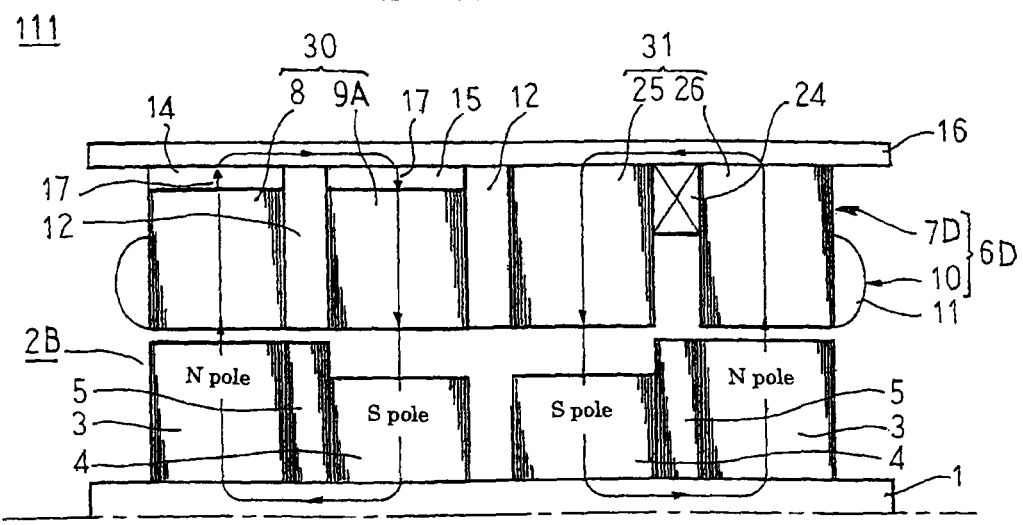
FIG. 19 is a longitudinal cross section that explains flow of magnetic flux in a rotary electric motor according to Embodiment 12 of the present invention.

FIG. 19 is a longitudinal cross section that explains flow of magnetic flux in a rotary electric motor according to Embodiment 12 of the present invention.

In FIG. 19, radial dimensions of a second stator core 9A are equal to those of a first stator core 8, and a second permanent magnet 15 is prepared into a cylindrical body that has dimensions equal to those of a first permanent magnet 14, and is mounted so as to surround the second stator core 9A. The second permanent magnet 15 is magnetically oriented such that a direction of magnetization 17 thereof is radially inward. In other words, the direction of magnetization 17 of the second permanent magnet 15 is a reverse direction to a direction of magnetization 17 of the first permanent magnet 14. A spacer 12 is interposed between the second stator core 9A and the third stator core 25.

Moreover, the rest of the configuration is configured in a similar manner to Embodiment 11 above.

Consequently, similar effects to those of Embodiment 11 above can also be achieved in Embodiment 12.

In a rotary electric motor 111 that has been configured in this manner, because the directions of magnetization 17 of the first permanent magnet 14 and the second permanent magnet 15 are oriented in the direction of flow of magnetic flux in the magnetic path, the magnet thickness of each can be reduced, enabling radial dimensions to be reduced.

Because the spacer 12 is interposed between the adjacent second stator core 9A and third stator core 25, a closed magnetic circuit in which magnetic flux from the second permanent magnet 15 flows axially from the second stator core 9A, enters the third stator core 25, flows radially outward from the third stator core 25, enters the frame 16, flows axially through the frame 16, and returns to the second permanent magnet 15 is prevented from forming. Thus, because magnetic flux from the second permanent magnet 15 flows through the rotor 2B without flowing through the closed magnetic circuit in question, reductions in the amount of magnetic flux that flows through the rotor 2B can be suppressed.

Embodiment 13

Figure 20:
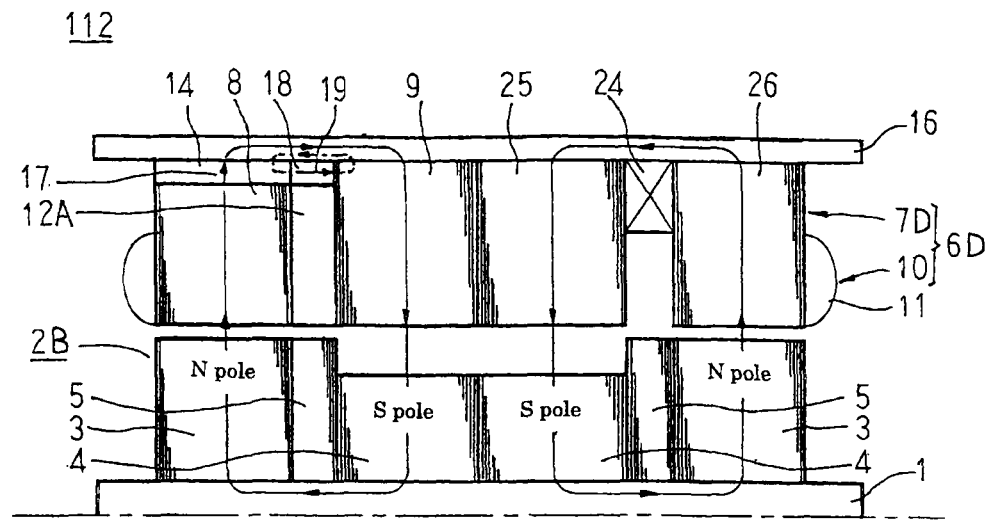
FIG. 20 is a longitudinal cross section that explains flow of magnetic flux in a rotary electric motor according to Embodiment 13 of the present invention.

FIG. 20 is a longitudinal cross section that explains flow of magnetic flux in a rotary electric motor according to Embodiment 13 of the present invention.

In FIG. 20, a spacer 12A is prepared into a cylindrical body that has a radial dimension equal to that of a core back 8a, and a third permanent magnet 18 is prepared into a cylindrical body that has an axial length equal to that of the spacer 12A and a radial dimension that is equal to that of a first permanent magnet 14, is mounted so as to surround the spacer 12A, and is interposed between the first permanent magnet 14 and a second stator core 9. The third permanent magnet 18 is magnetically oriented axially such that a direction of magnetization 19 thereof is directed from the first permanent magnet 14 toward the core back 9a of the second stator core 9.

Moreover, the rest of the configuration is configured in a similar manner to Embodiment 11 above.

In a rotary electric motor 112 that has been configured in this manner, a magnetic path is formed in which magnetic flux from the third permanent magnet 18 enters the frame 16 from the third permanent magnet 18 through the second stator core 9, flows through the frame 16 toward the first permanent magnet 14, and returns to the third permanent magnet 18 through the first permanent magnet 14, as indicated by a dotted chain line in FIG. 20. Here, the magnetic flux from the third permanent magnet 18 flows through the frame 16 in a reverse direction to the magnetic flux from the first permanent magnet 14, alleviating magnetic saturation of the frame 16. In other words, the third permanent magnet 18 constitutes a magnetic saturation alleviating means for the axial magnetic path forming member.

Thus, according to Embodiment 13, because magnetic saturation of the frame 16 is alleviated, the amount of effective magnetic flux is increased, enabling output to be improved, and the frame 16 can also be made thinner, enabling reductions in size and weight of the rotary electric motor 112.

Moreover, in Embodiment 13 above, the direction of magnetization 17 of the first permanent magnet 14 is radially outward, but the direction of magnetization 17 of the first permanent magnet 14 may also be radially inward. In that case, the third permanent magnet 18 is magnetically oriented axially so as to be directed from the second stator core 9 toward the first permanent magnet 14.

Embodiment 14

Figure 21:
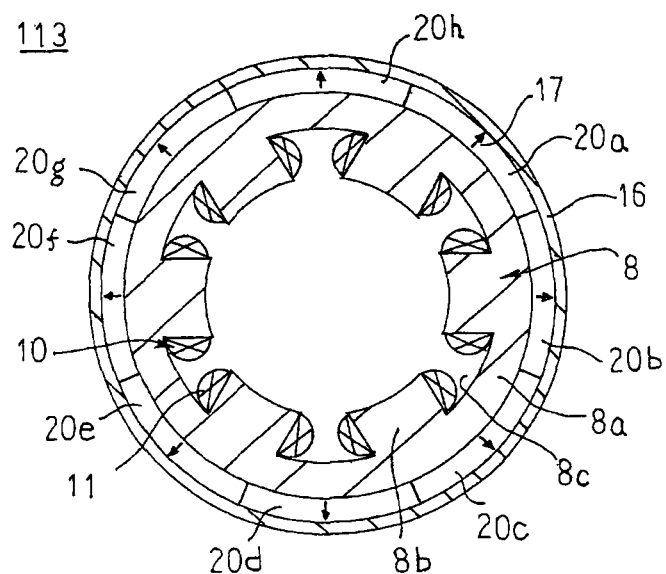
FIG. 21 is a lateral cross section that shows a rotary electric motor according to Embodiment 14 of the present invention.

FIG. 21 is a lateral cross section that shows a rotary electric motor according to Embodiment 14 of the present invention.

In FIG. 21, a first permanent magnet is constituted by strip-shaped magnet bodies 20a through 20h that have circular arc-shaped cross sections that have a shape in which a first permanent magnet 14 that has a cylindrical body described above has been divided into eight, for example, equal sections circumferentially. Each of the magnet bodies 20a through 20h is magnetically oriented such that the direction of magnetization 17 thereof is oriented radially outward. Moreover, the rest of the configuration is configured in a similar manner to Embodiment 11 above.

Now, if the permanent magnets are prepared into single cylindrical bodies, magnetic flux components that interact with the permanent magnets during rotation of the rotor fluctuate somewhat, generating eddy current loss due to the fluctuating magnetic flux in the permanent magnets together therewith.

In a rotary electric motor 113 that has been configured in this manner, because the permanent magnets are divided into a plurality of magnet bodies 20a through 20h, eddy current paths are also simultaneously divided, and eddy currents are reduced as a result, enabling eddy current loss that arises in the permanent magnets also to be reduced.

Moreover, in Embodiment 14 above, the magnet bodies 20a through 20h are arranged on an outer peripheral surface of the first stator core 8 without leaving gaps circumferentially, but a plurality of magnet bodies may also be arranged on an outer peripheral surface of a first stator core so as to have predetermined gaps circumferentially, and only one magnet body may also be disposed. If a plurality of magnet bodies are arranged circumferentially on an outer peripheral surface of a first stator core, the magnetic balance will improve if they are arranged at a uniform angular pitch.

Embodiment 15

Figure 22:
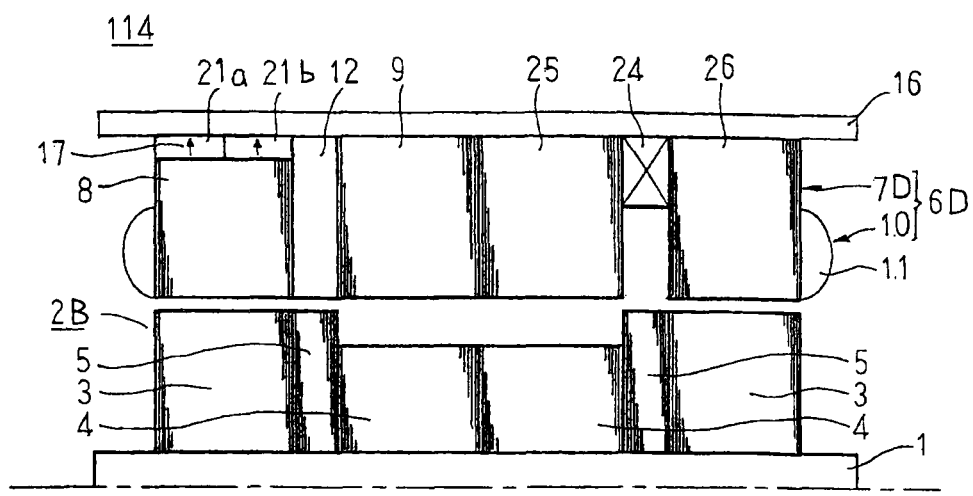
FIG. 22 is a longitudinal cross section that shows a rotary electric motor according to Embodiment 15 of the present invention.

FIG. 22 is a longitudinal cross section that shows a rotary electric motor according to Embodiment 15 of the present invention.

In FIG. 22, a first permanent magnet is constituted by magnet bodies 21a and 21b that have cylindrical bodies that have a shape in which a first permanent magnet 14 that has a cylindrical body described above has been divided into two equal sections axially. The magnet bodies 21a and 21b are each magnetically oriented such that the direction of magnetization 17 thereof is oriented radially outward. Moreover, the rest of the configuration is configured in a similar manner to Embodiment 11 above.

In a rotary electric motor 114 that has been configured in this manner, the magnet bodies 21a and 21b are fitted so as to surround the first stator core 8 such that directions of magnetization 17 thereof are oriented radially outward and so as to be adjacent in an axial direction.

Consequently, in this rotary electric motor 114 eddy current paths are also divided by dividing the permanent magnet, enabling permanent magnet eddy current loss to be reduced.

Moreover, in Embodiment 15 above, a first permanent magnet is constituted by magnet bodies that have cylindrical bodies that have been divided into two sections axially, but the first permanent magnet may also be divided into three or more sections axially. Each of the magnet bodies may also be disposed so as to leave gaps axially.

Embodiment 16

Figure 23:
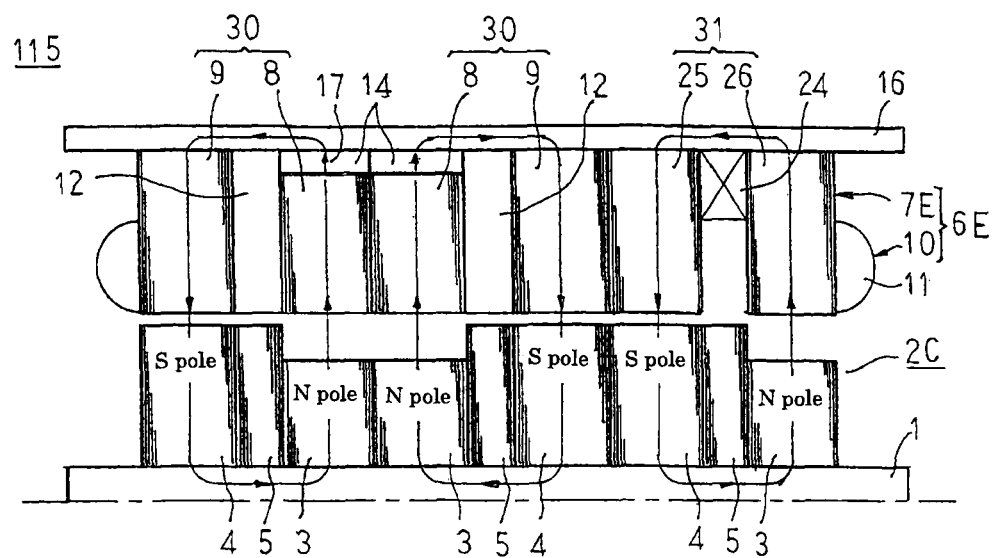
FIG. 23 is a longitudinal cross section that explains flow of magnetic flux in a rotary electric motor according to Embodiment 16 of the present invention.

FIG. 23 is a longitudinal cross section that explains flow of magnetic flux in a rotary electric motor according to Embodiment 16 of the present invention.

In FIG. 23, a stator 6E is constituted by: a stator core 7E; and a stator coil 10.

The stator core 7E is constituted by: two first core pairs 30 that are constituted by first and second stator cores 8 and 9 that are disposed coaxially on opposite sides of a spacer 12 such that the circumferential positions of teeth 8b and 9b are aligned; and one second core pair 31 that is constituted by third and fourth stator cores 25 and 26 that are disposed coaxially on opposite sides of a field coil 24 such that circumferential positions of teeth 25b and 26b are aligned. The two first core pairs 30 are arranged coaxially in an axial direction so as to place the first stator cores 8 in close contact with each other, and such that the circumferential positions of the teeth 8b are aligned. In addition, the second core pair 31 is disposed coaxially at a second axial end of the two first core pairs 30 so as to place the third stator core 25 in close contact with the second stator core 9 of one of first core pairs 30, and such that circumferential positions of the teeth 9b and 25b are aligned.

A first permanent magnet 14 is fitted over the first stator core 8 of each of the first core pairs 30. The first permanent magnets 14 are magnetically oriented such that directions of magnetization 17 thereof are radially outward. A field magnetomotive force generating means is constituted by the two first permanent magnets 14 and the single field coil 24.

The stator core 7E is housed and held inside the frame 16 with the first permanent magnets 14 and the field coil 24 mounted. Outer peripheral surfaces of the first permanent magnets 14, the second stator cores 9, the third stator core 25, and the fourth stator core 26 are magnetically linked by the frame 16.

The stator coil 10 has six phase coils 11 that are each formed by winding conducting wires onto sets of teeth 8b, 9b, 25b, and 26b that are arranged in a single row axially without spanning the slots 8c, 9c, 25c, and 26c.

A rotor 2C is configured by disposing three rotor core pairs in which first and second rotor cores 3 and 4 are disposed in close proximity to each other on opposite sides of a partitioning wall 5 so as to be offset circumferentially by a pitch of half a salient pole so as to be lined up axially, and fixing them to a rotating shaft 1 that is inserted through rotating shaft insertion apertures thereof. In an axially central rotor core pair and a rotor core pair at a first axial end, first rotor cores 3 are placed in close proximity to each other, and circumferential positions of salient poles 3b are aligned. In the axially central rotor core pair and a rotor core pair at a second axial end, second rotor cores 4 are placed in close proximity to each other, and circumferential positions of salient poles 4b are aligned. The rotor 2C is rotatably housed inside the stator core 7E such that the rotating shaft 1 is rotatably supported by a pair of end plates (not shown). Moreover, the first and second rotor cores 3 and 4 are respectively positioned on inner peripheral sides of the first through fourth stator cores 8, 9, 25, and 26.

In a rotary electric motor 115 that has been configured in this manner, as indicated by arrows in FIG. 23, a magnetic path is formed in each of the first core pairs 30 in which magnetic flux flows from the first permanent magnet 14 through the frame 16 to the second stator core 9, then flows from the second stator core 9, through the second rotor core 4, the partitioning wall 5, and the rotating shaft 1 to the first rotor core 3, and then from the first rotor core 3 through the first stator core 8 and returns to the first permanent magnet 14. A magnetic path is formed in the second core pair 31 in which magnetic flux from the field coil 24 flows from the fourth stator core 26 through the frame 16 to the third stator core 25, then flows from the third stator core 25, through the second rotor core 4, the partitioning wall 5, and the rotating shaft 1 to the first rotor core 3, and then from the first rotor core 3 returns to the fourth stator core 26.

By changing the amount of field current to the field coil 24 and the direction of passage of electric current, the amount of magnetic flux and the direction of flow of magnetic flux can be changed to adjust the magnetomotive force from the field magnetomotive force generating means.

Consequently, similar effects to those in Embodiment 11 above are also exhibited in Embodiment 16. According to Embodiment 16, because the magnetic flux from the first permanent magnets 14 branches off and flows through the frame 16 in two axial directions, the amount of magnetic flux per pole is reduced. As a result, the frame 16 is less likely to become magnetically saturated even if the radial thickness thereof is reduced, enabling the diameter of the frame 16 to be reduced. Reductions in the diameter of the rotary electric motor 115 thereby become possible.

Moreover, in Embodiment 16 above, two first core pairs 30 are disposed next to each other so as to place the first stator cores 8 in close contact with each other, but the two first core pairs 30 may also be disposed such that the first stator cores 8 are placed next to each other so as to have a spacer, etc., interposed that is made of a nonmagnetic material.

In Embodiment 16 above, the first rotor cores 3 and the second rotor cores 4 are disposed next to each other in close contact with each other, but the first rotor cores 3 and the second rotor cores 4 may also be disposed next to each other so as to leave respective gaps in an axial direction.

In Embodiment 16 above, the first permanent magnets 14 are disposed radially outside the first stator cores 8, but the first permanent magnets 14 may also be disposed radially outside the second stator cores 9. In that case, because a second stator core 9 on which a first permanent magnet 14 is disposed and the third stator core 25 are adjacent to each other, it is preferable that a gap be disposed between the adjacent second stator core 9 and third stator core 25 to avoid formation of a closed magnetic circuit in the second stator core 9, the third stator core 25, and the frame 16, and suppress reductions in the amount of magnetic flux that flows to the rotor 2C.

In Embodiment 16 above, two first core pairs 30 are disposed next to each other so as to place the first stator cores 8 in close contact with each other, but the two first core pairs 30 may also be disposed such that the second stator cores 9 are placed next to each other in close contact with each other. In that case, because a first stator core 8 on which the first permanent magnet 14 is disposed and the third stator core 25 are adjacent to each other, it is preferable that a gap be disposed between the adjacent first stator core 8 and third stator core 25 to avoid formation of a closed magnetic circuit in the first stator core 8, the third stator core 25, and the frame 16, and suppress reductions in the amount of magnetic flux that flows to the rotor 2C.

In Embodiment 16, a second permanent magnet may also be disposed radially outside at least one second stator core 9 in addition to the first permanent magnets 14 that are disposed radially outside the first stator core 8, in a similar manner to Embodiment 12 above. In that case also, if the second permanent magnet is disposed in the second stator core 9 that is adjacent to the third stator core 25, it is preferable that a gap be disposed between the adjacent second stator core 9 and third stator core 25 to avoid formation of a closed magnetic circuit in the second stator core 9, the third stator core 25, and the frame 16.

Embodiment 17

Figure 24:
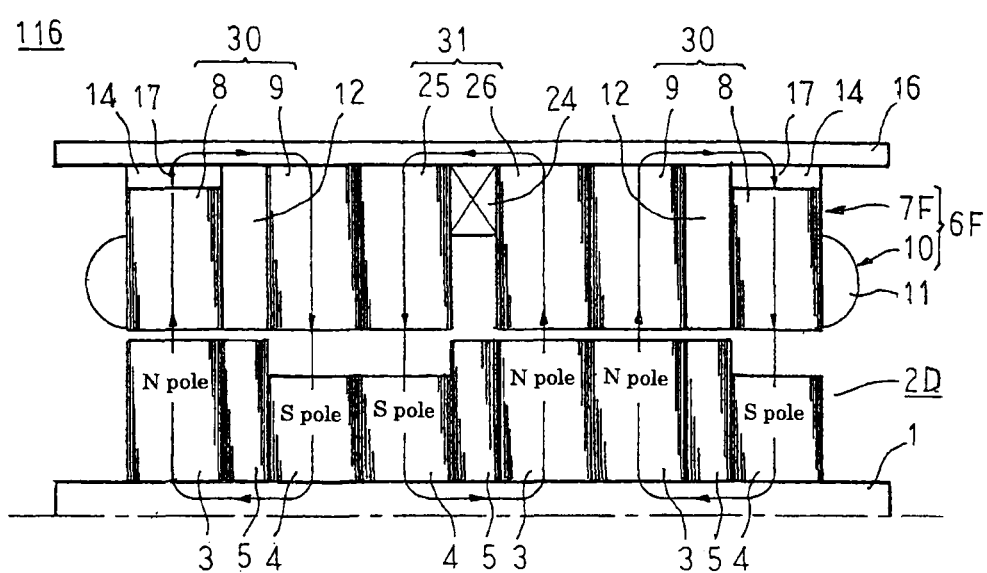
FIG. 24 is a longitudinal cross section that explains flow of magnetic flux in a rotary electric motor according to Embodiment 17 of the present invention.

FIG. 24 is a longitudinal cross section that explains flow of magnetic flux in a rotary electric motor according to Embodiment 17 of the present invention.

In FIG. 24, a stator 6F is constituted by: a stator core 7F; and a stator coil 10.

The stator core 7F is constituted by: two first core pairs 30 that are constituted by first and second stator cores 8 and 9 that are disposed coaxially on opposite sides of a spacer 12 such that the circumferential positions of teeth 8b and 9b are aligned; and one second core pair 31 that is constituted by third and fourth stator cores 25 and 26 that are disposed coaxially on opposite sides of a field coil 24 such that circumferential positions of teeth 25b and 26b are aligned. A first of the first core pairs 30 is arranged coaxially at a first axial end of the second core pair 31 so as to place the second stator core 9 in close contact with the third stator core 25, and such that circumferential positions of teeth 9b and 25b are aligned. In addition, a second of the first core pairs 30 is arranged coaxially at a second axial end of the second core pair 31 so as to place the second stator core 9 in close contact with the fourth stator core 26, and such that circumferential positions of teeth 9b and 26b are aligned.

A first permanent magnet 14 is fitted over the first stator core 8 of each of the first core pairs 30. The first permanent magnet 14 that is mounted to the first core pair 30 at the first axial end of the second core pair 31 is magnetically oriented such that a direction of magnetization 17 thereof is radially outward, and the first permanent magnet 14 that is mounted to the first core pair 30 at the second axial end of the second core pair 31 is magnetically oriented such that a direction of magnetization 17 thereof is radially inward.

A rotor 2D is configured by disposing three rotor core pairs in which first and second rotor cores 3 and 4 are disposed in close proximity to each other on opposite sides of a partitioning wall 5 so as to be offset circumferentially by a pitch of half a salient pole so as to be lined up axially, and fixing them to a rotating shaft 1 that is inserted through rotating shaft insertion apertures thereof. In an axially central rotor core pair and a rotor core pair at a first axial end, second rotor cores 4 are placed in close proximity to each other, and circumferential positions of salient poles 4b are aligned. In the axially central rotor core pair and a rotor core pair at a second axial end, first rotor cores 3 are placed in close proximity to each other, and circumferential positions of salient poles 3b are aligned. The rotor 2D is rotatably housed inside the stator core 7F such that the rotating shaft 1 is rotatably supported by a pair of end plates (not shown). Moreover, the first and second rotor cores 3 and 4 are respectively positioned on inner peripheral sides of the first through fourth stator cores 8, 9, 25, and 26.

Moreover, the rest of the configuration is configured in a similar manner to Embodiment 16 above.

In a rotary electric motor 116 that has been configured in this manner, as indicated by arrows in FIG. 24, a magnetic path is formed in the second core pair 31 in which magnetic flux from the field coil 24 flows from the fourth stator core 26 through the frame 16 to the third stator core 25, then flows from the third stator core 25, through the second rotor core 4, the partitioning wall 5, and the rotating shaft 1 to the first rotor core 3, and then from the first rotor core 3 returns to the fourth stator core 26. In the first core pair 30 at the first axial end of the second core pair 31, a magnetic path is formed in which magnetic flux flows from the first permanent magnet 14 through the frame 16 to the second stator core 9, then flows from the second stator core 9, through the second rotor core 4, the partitioning wall 5, and the rotating shaft 1 to the first rotor core 3, and then from the first rotor core 3 through the first stator core 8 and returns to the first permanent magnet 14. In the first core pair 30 at the second axial end of the second core pair 31, a magnetic path is formed in which magnetic flux flows from the first permanent magnet 14 through the first stator core 8, the first rotor core 3, the partitioning wall 5, and the rotating shaft 1 to the second rotor core 4, then flows from the second rotor core 4 through the second stator core 9 and the frame 16 and returns to the first permanent magnet 14.

By changing the amount of field current to the field coil 24 and the direction of passage of electric current, the amount of magnetic flux and the direction of flow of magnetic flux can be changed to adjust the magnetomotive force from the field magnetomotive force generating means.

Consequently, similar effects to those in Embodiment 11 above are also exhibited in Embodiment 16.

Now, in Embodiment 17 above, two first core pairs 30 are disposed at two ends of the second core pair 31 so as to place the second stator core 9 in contact with the third stator core 25 and the fourth stator core 26, but the two first core pairs 30 may also be disposed at two ends of the second core pair 31 so as to have a spacer, etc., interposed that is made of a nonmagnetic material.

In Embodiment 17 above, the first rotor cores 3 and the second rotor cores 4 are disposed next to each other in close contact with each other, but the first rotor cores 3 and the second rotor cores 4 may also be disposed next to each other so as to leave respective gaps in an axial direction.

In Embodiment 17 above, the first permanent magnets 14 are disposed radially outside the first stator cores 8, but the first permanent magnets 14 may also be disposed radially outside the second stator cores 9. In that case, because a second stator core 9 on which a first permanent magnet 14 is disposed and the third stator core 25 are adjacent to each other, it is preferable that a gap be disposed between the adjacent second stator core 9 and third stator core 25 to avoid formation of a closed magnetic circuit in the second stator core 9, the third stator core 25, and the frame 16, and suppress reductions in the amount of magnetic flux that flows to the rotor 2D. Similarly, because a second stator core 9 on which a first permanent magnet 14 is disposed and the fourth stator core 26 are adjacent to each other, it is preferable that a gap be disposed between the adjacent second stator core 9 and fourth stator core 26 to avoid formation of a closed magnetic circuit in the second stator core 9, the fourth stator core 26, and the frame 16, and suppress reductions in the amount of magnetic flux that flows to the rotor 2D.

In Embodiment 17, a second permanent magnet may also be disposed radially outside at least one second stator core 9 in addition to the first permanent magnets 14 that are disposed radially outside the first stator cores 8, in a similar manner to Embodiment 12 above. In that case also, if the second permanent magnet is disposed in the second stator core 9 that is adjacent to the third stator core 25, it is preferable that a gap be disposed between the second stator core 9 and third stator core 25 to avoid formation of a closed magnetic circuit in the second stator core 9, the third stator core 25, and the frame 16.

In Embodiments 16 and 17 above, two first core pairs 30 and one second core pair 31 are arranged coaxially in an axial direction, but the first and second core pairs 30 and 31 are not limited to these numbers of pairs, provided that there are two or more first core pairs 30 and one or more second core pair 31. In that case, the first core pairs 30 are disposed such that the first stator cores 8 are next to each other. The second core pairs 31 are disposed so as to line up with the first core pairs 30 such that a third stator core 25 or a fourth stator core 26 is placed next to a second stator core 9. In addition, first permanent magnets 14 that are mounted to adjacent first core pairs 30 are magnetically oriented in identical directions of magnetization 17, and first permanent magnets 14 that are mounted to first core pairs 30 which are disposed on opposite sides of the second core pair 31 are magnetically oriented in reverse directions of magnetization 17.

Moreover, in each of Embodiments 11 through 17 above, the first through fourth stator cores are prepared by laminating magnetic steel plates, but the first through fourth stator cores are not limited to laminated cores that are formed by laminating magnetic steel plates, and, for example, dust cores may also be used that are obtained by subjecting a magnetic metal powder to an insulating treatment, and then pressure forming and applying a heat treatment thereto.

In Embodiments 11 through 17 above, a frame that is prepared using a magnetic material is used as an axial magnetic path forming member, but the axial magnetic path forming member need only be prepared using a magnetic material so as to be continuous in an axial direction, and, for example, magnetic members may also be used that are prepared into strip shapes using a magnetic material. In that case, the strip-shaped magnetic members should be disposed so as to extend axially so as to link outer peripheral surfaces of first permanent magnets and outer peripheral surfaces of second stator cores, and so as to link outer peripheral surfaces of third stator cores and outer peripheral surfaces of fourth stator cores.

In Embodiments 1 through 17 above, first and second rotor cores that constitute a rotor are prepared by laminating magnetic steel plates, but the first and second rotor cores may also be prepared using solid bodies of magnetic steel materials.

In Embodiments 1 through 17 above, a stator coil is configured by winding conducting wires into a concentrated winding, but a stator coil may also be configured by winding conducting wires into a distributed winding.

In Embodiments 1 through 17 above, a spacer is interposed between first and second stator cores, but the spacer may also be omitted provided that a predetermined gap is ensured between the first and second stator cores.

In Embodiments 1 through 17 above, a rotating shaft is prepared using a magnetic material, but it is not absolutely necessary for the rotating shaft to be prepared using a magnetic material provided that a rotor is configured such that a sufficient amount of magnetic flux can flow from a second rotor core to a first rotor core without passing through the rotating shaft.

Embodiment 18

Figure 25:
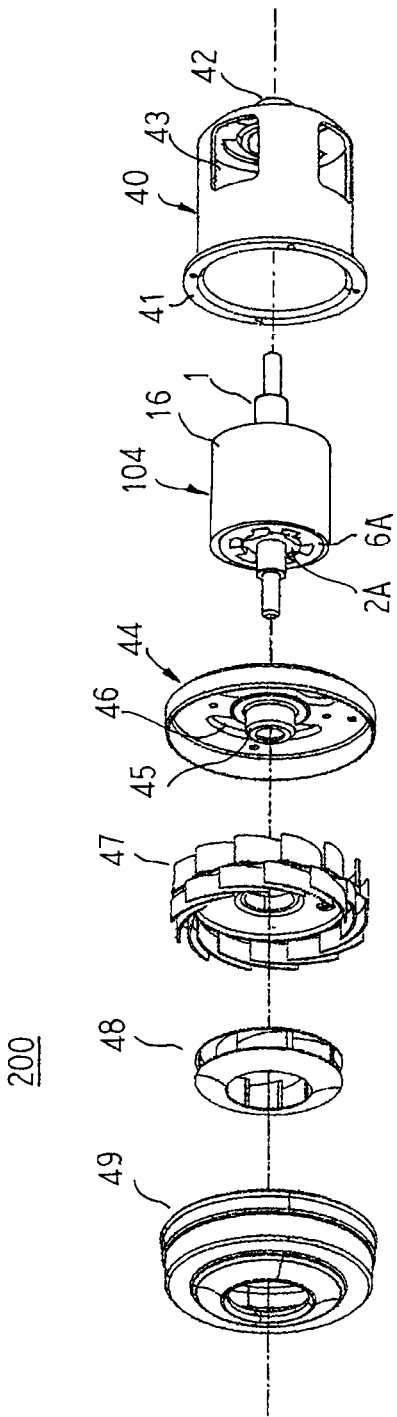
FIG. 25 is an exploded perspective that shows a blower according to Embodiment 18 of the present invention.
Figure 26:
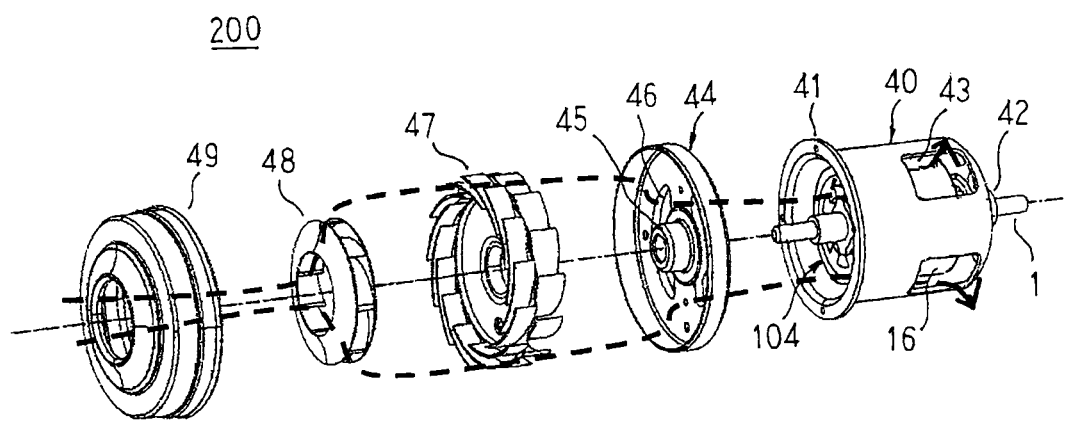
FIG. 26 is an exploded perspective that explains airflow in the blower according to Embodiment 18 of the present invention.

FIG. 25 is an exploded perspective that shows a blower according to Embodiment 18 of the present invention, and FIG. 26 is an exploded perspective that explains airflow in the blower according to Embodiment 18 of the present invention.

In FIG. 25, a case 40 is prepared into a floored cylindrical shape, a flange portion 41 is formed near an opening thereof, a bearing 42 is formed on a central portion of a bottom portion, and air discharge apertures 43 are disposed through a peripheral wall of the case 40 near the bottom portion. A bracket 44 has a bearing 45 and ventilating windows 46, and is fastened to the flange portion 41 to cover the opening of the case 40. A rotary electric motor 104 is housed inside the case 40 such that a rotating shaft 1 is rotatably supported in the bearings 42 and 45 of the case 40 and the bracket 44. Here, a gap that is formed between an outer peripheral wall surface of the frame 16 and an inner peripheral wall surface of the case 40 constitutes a ventilation channel that has an air channel direction in an axial direction. A diffuser 47 is mounted in a fixed state on an opposite side of the bracket 44 from the case 40. A centrifugal fan 48 is fixed to an end of the rotating shaft 1 that projects from the bearing 45 of the bracket 44, and is rotatably housed radially inside the diffuser 47. A fan cover 49 is mounted to the bracket 44, and houses the diffuser 47 and the centrifugal fan 48 internally. Moreover, the diffuser 47 and the centrifugal fan 48 constitute a blower fan.

In a blower 200 that has been configured in this manner, the centrifugal fan 48 is driven to rotate by rotational driving of the rotary electric motor 104. Thus, as indicated by arrows in FIG. 26, air that has been sucked in through the fan cover 49, is deflected radially outward by the centrifugal fan 48, and is smoothed into an axial flow by the diffuser 47. Next, the air that has been smoothed into an axial flow by the diffuser 47 is deflected radially inward by the bracket 44, flows into the case 40 through the ventilating windows 46, flows through the ventilation channel between the inner peripheral wall surfaces of the frame 16 and the case 40, and is discharged through the air discharge apertures 43.

The blower 200 can be applied to vacuum cleaners, etc., if an air suction function is used, and can be used in hand dryers, etc., if an air exhaust function is used.

In Embodiment 18, a rotary electric motor 104 that enables reduced size and increased speed is used as a driving motor for the centrifugal fan 48. Thus, the rotary electric motor 104 will not obstruct the expulsion air channel of the centrifugal fan 48, facilitating disposition of the rotary electric motor 104. In addition, a predetermined suction force or blow pressure can be obtained without increasing the diameter of the centrifugal fan 48, and resistance against centrifugal forces during high speed running can also be ensured due to the reduced size of the centrifugal fan 48.

Because a permanent magnet 14 is mounted to the stator core, stator magnetomotive force harmonic components rarely pass through the permanent magnet 14. Thus, eddy current loss of the permanent magnet 14 can be kept low, suppressing temperature increases in the permanent magnet 14.

When the rotary electric motor 104 is rotated at high speed, the quantity of heat generated in the bearings 42 and 45 is increased. However, a ventilation channel between the frame 16 of the rotary electric motor 104 and the inner peripheral wall surfaces of the case 40 is configured such that air that has flowed into the case 40 flows axially along the outer peripheral wall surface of the frame 16 and is discharged through the air discharge apertures 43. In addition, an outer peripheral surface of the permanent magnet 14, which has the largest area of the magnet configuring surfaces, is in contact with the inner peripheral wall surface of the frame 16. Thus, even if heat that is generated by the bearings 42 and 45 is transferred to the permanent magnet 14, the heat is transferred to the frame 16 from the permanent magnet 14, and is radiated to the air that flows along the outer peripheral wall surface of the frame 16. Consequently, excessive temperature increases in the permanent magnet 14 can be suppressed, and the permanent magnet 14 will not be thermally demagnetized. Thus, because it is also not necessary to increase heat resistance by increasing added quantities of the expensive element dysprosium (Dy), cost reductions for the permanent magnet 14 can be achieved.

Embodiment 19

Figure 27:
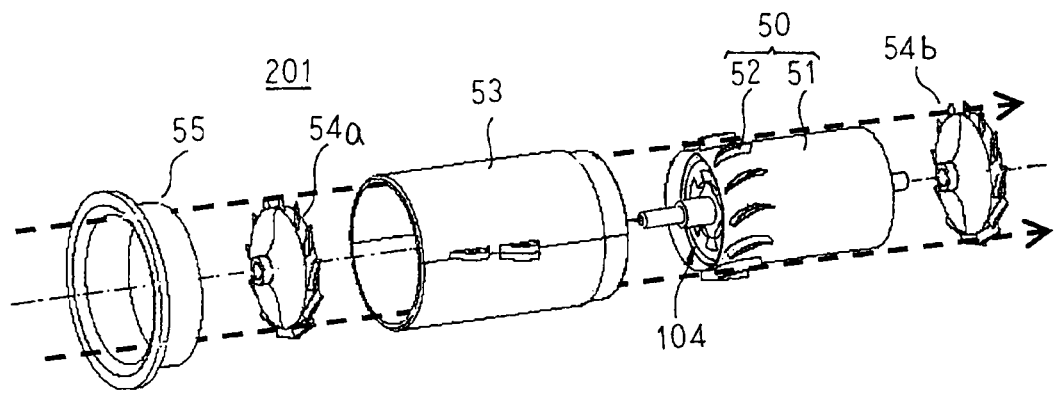
FIG. 27 is an exploded perspective that shows a blower according to Embodiment 19 of the present invention.

FIG. 27 is an exploded perspective that shows a blower according to Embodiment 19 of the present invention.

In FIG. 27, a stator vane 50 has: a pipe 51 that is prepared into a cylindrical shape that has an inside diameter that is equal to an outside diameter of a frame 16 of a rotary electric motor 104, and in which an axial length is longer than an axial length of the frame 16; and blades 52 that are formed on an outer peripheral surface at a first axial end of the pipe 51, and the pipe 51 is fitted over the rotary electric motor 104 so as to contact the outer peripheral surface of the frame 16. A case 53 is prepared into a cylindrical shape, in which an axial length is longer than the axial length of the pipe 51, and is fitted over the stator vane 50 so as to form a gap with the pipe 51. Here, the gap that is formed between an outer peripheral wall surface of the pipe 51 and an inner peripheral wall surface of the case 53 constitutes a ventilation channel that has an air channel direction in an axial direction. A pair of rotor vanes 54a and 54b are respectively disposed at two axial ends of the case 53 be being fixed to two ends of the rotating shaft 1 of the rotary electric motor 104. A bell mouth 55 that functions as a fan cover is fitted into an opening at a first axial end of the case 53. Moreover, an axial flow fan is constituted by the rotor vanes 54a and 54b and the stator vane 50.

In a blower 201 that has been configured in this manner, the pair of rotor vanes 54a and 54b are driven to rotate by rotational driving of the rotary electric motor 104. Thus, as indicated by arrows in FIG. 27, air flows in axially through the bell mouth 55, and is increased in pressure by the rotor vane 54a. That flow of air, which has a circumferential component, is directed axially by the blades 52 of the stator vane 50 that is disposed downstream from the rotor vane 54a, and flows through the ventilation channel between the pipe 51 and the case 53 along the outer peripheral wall surface of the pipe 51. Then, the air that has flowed through the ventilation channel between the pipe 51 and the case 53 is discharged externally by the rotor vane 54b.

In a similar manner to the blower 200 described above, the blower 201 can be applied to vacuum cleaners, etc., if an air suction function is used, and can be used in hand dryers, etc., if an air exhaust function is used.

In Embodiment 19, a rotary electric motor 104 that enables reduced size and increased speed is used as a driving motor for the rotor vanes 54a and 54b. Thus, the rotary electric motor 104 will not obstruct the expulsion air channel of the axial fan, facilitating disposition of the rotary electric motor 104. In addition, a predetermined suction force or blow pressure can be obtained without increasing the diameter of the rotor vanes 54a and 54b, and resistance against centrifugal forces during high speed running can also be ensured due to the reduced size of the rotor vanes 54a and 54b.

Because a permanent magnet 14 is mounted to the stator core, stator magnetomotive force harmonic components rarely pass through the permanent magnet 14. Thus, eddy current loss of the permanent magnet 14 can be kept low, suppressing temperature increases in the permanent magnet 14.

A ventilation channel between the outer peripheral wall surface of the pipe 51 that is fitted over so as to contact the frame 16 of the rotary electric motor 104 and the inner peripheral wall surface of the case 53 is configured such that air that has flowed into the case 53 flows axially. In addition, an outer peripheral surface of the permanent magnet 14, which has the largest area of the magnet configuring surfaces, is in contact with the inner peripheral wall surface of the frame 16 that contacts the pipe 51. Thus, even if heat that is generated by bearings (not shown), etc., is transferred to the permanent magnet 14, the heat is transferred to the pipe 51 through the frame 16 from the permanent magnet 14, and is radiated to the air that flows along the outer peripheral wall surface of the pipe 51. In addition, the blades 52 that are formed on the outer peripheral wall surface of the pipe 51 act as radiating fins, enabling heat from the permanent magnet 14 to be radiated effectively. Consequently, excessive temperature increases in the permanent magnet 14 can be suppressed, and the permanent magnet 14 will not be thermally demagnetized. Thus, because it is also not necessary to increase heat resistance by increasing added quantities of the expensive element dysprosium (Dy), cost reductions for the permanent magnet 14 can be achieved.

Moreover, in Embodiment 19 above, the axial flow fan is constituted by a stator vane and a pair of rotor vanes that are disposed so as to be at opposite ends of the stator vane, but the axial flow fan need only have at least a stator vane and a rotor vane.

In Embodiment 19 above, the stator vane is fitted over the frame of the rotary electric motor, but the stator vane may be disposed in close proximity to the rotor vane upstream from the rotary electric motor. In that case, because the positions of the rotor vane and the stator vane are in close proximity, occurrences of fluid separation between the rotor vane and the stator blade are suppressed, enabling fluid loss to be reduced.

Embodiment 20

Figure 28:
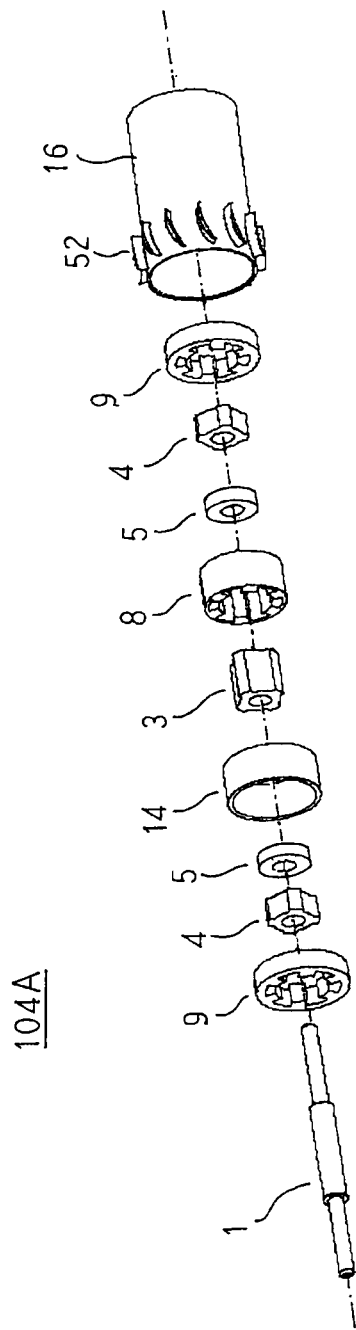
FIG. 28 is an exploded perspective that explains airflow in a blower according to Embodiment 20 of the present invention.

FIG. 28 is an exploded perspective that explains airflow in a blower according to Embodiment 20 of the present invention.

In FIG. 28, blades 52 are formed on an outer peripheral surface at a first axial end of a frame 16. A stator vane is constituted by the frame 16 and the blades 52.

Moreover, the rest of the configuration is configured in a similar manner to Embodiment 19 above.

In FIG. 28, a stator coil has been omitted, and a first rotor core 3, a first stator core 8, and a first permanent magnet 14 correspond to an adjacent pair of first rotor cores, a pair of first stator cores and a pair of first permanent magnets, respectively.

In Embodiment 20, because the frame 16 of the rotary electric motor 104A also functions as a pipe of the stator vane, the blower can be reduced in size.

Because heat is transferred from the permanent magnet 14 to the frame 16, and is radiated to the air that flows along the outer peripheral wall surface of the frame 16, the permanent magnet 14 is cooled more effectively.

Now, in Embodiments 18 through 20 above, a rotary electric motor 104 according to Embodiment 5 has been used as the driving motor of the blower, but similar effects can also be achieved using a rotary electric motor according to the other embodiments.

What is claimed is:

1. A rotary electric motor comprising:
    a stator comprising:
        a stator core that comprises a first core pair including a first stator core and a second stator core in which teeth that partition off slots that have openings on an inner peripheral side are disposed at a uniform angular pitch circumferentially so as to project radially inward from an inner peripheral surface of a cylindrical core back, the first stator core and the second stator core being disposed coaxially so as to be separated by a predetermined distance axially and such that circumferential positions of said teeth are aligned; and
        a stator coil that is mounted to said stator core;
    a first permanent magnet that is disposed on an outer peripheral surface of said core back of said first stator core, and that is magnetically oriented such that a direction of magnetization is only in a first radial direction, the first permanent magnet extending around an entire circumference of the outer peripheral surface of said core back of said first stator core;
    an axial magnetic path forming member that extends axially so as to link an outer peripheral surface of said first permanent magnet and an outer peripheral surface of a core back of said second stator core; and
    a rotor that is configured such that a first rotor core and a second rotor core on which salient poles are disposed at a uniform angular pitch circumferentially are fixed coaxially to a rotating shaft so as to be positioned on inner peripheral sides of said first stator core and said second stator core, respectively, and such that centers of the salient poles of said first rotor core are offset circumferentially by a pitch of half a salient pole from centers of the salient poles of said second rotor core.

2. A rotary electric motor according to claim 1, further comprising a third permanent magnet that is disposed between said first permanent magnet and said core back of said second stator core, said third permanent magnet being magnetically oriented such that a direction of magnetization is directed from said first permanent magnet toward said core back of said second stator core if said direction of magnetization of said first permanent magnet is directed radially outward, and being magnetically oriented such that said direction of magnetization is directed from said core back of said second stator core toward said first permanent magnet if said direction of magnetization of said first permanent magnet is directed radially inward.

3. A rotary electric motor according to claim 1, wherein said first permanent magnet includes a single cylindrical body.

4. A rotary electric motor according to claim 1, wherein said first permanent magnet is configured by arranging circumferentially a plurality of magnet bodies that are prepared into strip shapes that have circular arc-shaped cross sections that have a predetermined thickness.

5. A rotary electric motor according to claim 1, wherein said first permanent magnet is configured by arranging a plurality of cylindrical bodies axially.

6. A rotary electric motor according to claim 1, further comprising a second permanent magnet that is disposed on an outer peripheral surface of said core back of said second stator core, and that is magnetically oriented such that a direction of magnetization is in a second radial direction,
    said second stator core being linked to said first permanent magnet by means of said second permanent magnet and said axial magnetic path forming member.

7. A rotary electric motor according to claim 6, further comprising a third permanent magnet that is disposed between said first permanent magnet and said second permanent magnet, said third permanent magnet being magnetically oriented such that a direction of magnetization is directed from said first permanent magnet toward said second permanent magnet if said direction of magnetization of said first permanent magnet is directed radially outward, and being magnetically oriented such that said direction of magnetization is directed from said second permanent magnet toward said first permanent magnet if said direction of magnetization of said first permanent magnet is directed radially inward.

8. A rotary electric motor according to claim 6, wherein said first permanent magnet and said second permanent magnet are prepared into a single cylindrical body.

9. A rotary electric motor according to claim 6, wherein said first permanent magnet and said second permanent magnet are configured by arranging circumferentially a plurality of magnet bodies that are prepared into strip shapes that have circular arc-shaped cross sections that have a predetermined thickness.

10. A rotary electric motor according to claim 6, wherein said first permanent magnet and said second permanent magnet are configured by arranging a plurality of cylindrical bodies axially.

11. A rotary electric motor according to claim 1, wherein said first stator core and said second stator core are constituted by laminated cores that are formed by laminating magnetic steel plates, or by dust cores.

12. A rotary electric motor according to claim 1, wherein:
    said stator core further comprises at least one second core pair that is configured such that a third stator core and a fourth stator core in which teeth that partition off slots that have openings on an inner peripheral side are disposed at a uniform angular pitch circumferentially so as to project radially inward from an inner peripheral surface of a cylindrical core back are disposed coaxially so as to be separated by a predetermined distance axially and such that circumferential positions of said teeth are aligned, said second core pair being disposed so as to be coaxial with and adjacent to said first core pair such that circumferential positions of said teeth of said third stator core and said fourth stator core are aligned with circumferential positions of said teeth of said first stator core and said second stator core;

an outer peripheral surface of said third stator core and an outer peripheral surface of said fourth stator core are linked by said axial magnetic path forming member;

said first rotor core and said second rotor core are fixed coaxially to said rotating shaft so as to be positioned on an inner peripheral side of said third stator core and said fourth stator core, respectively, and so as to be offset by a pitch of half a salient pole circumferentially from each other; and a field coil is interposed between said core back of said third stator core and said core back of said fourth stator core.

13. A rotary electric motor according to claim 12, wherein said first stator core through said fourth stator core are constituted by laminated cores that are formed by laminating magnetic steel plates, or by dust cores.

14. A blower comprising:

a rotary electric motor according to claim 1;

a case that houses said rotary electric motor internally, and in which a ventilation channel that has an air channel direction in an axial direction is formed along a radially outer peripheral surface of said rotary electric motor;

a blower fan that is driven by said rotary electric motor; and a fan cover that is mounted to said case so as to cover said blower fan, said blower being configured such that pressure is applied to air that is sucked inside said fan cover by said blower fan being driven by said rotary electric motor to make said air flow axially through said ventilation channel and to discharge said air outside said case.

15. A blower according to claim 14, wherein said blower fan comprises:

a centrifugal fan that is fixed to said rotating shaft of said rotary electric motor; and a diffuser that smooths into an axial flow air that has been deflected centrifugally by said centrifugal fan.

16. A blower according to claim 14, wherein said blower fan comprises:

a rotor vane that is fixed to said rotating shaft of said rotary electric motor; and a stator vane that is disposed downstream from said rotor vane, and smooths into an axial flow air that has been increased in pressure by said rotor vane.

* * * * *